United States Patent
Duan

(10) Patent No.: US 12,088,480 B2
(45) Date of Patent: Sep. 10, 2024

(54) NETWORK ANALYTICS TRANSFER METHOD AND APPARATUS, AND NETWORK FUNCTION ENTITY

(71) Applicant: DATANG MOBILE COMMUNICATIONS EQUIPMENT CO., LTD., Beijing (CN)

(72) Inventor: Xiaoyan Duan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/549,573

(22) PCT Filed: Mar. 2, 2022

(86) PCT No.: PCT/CN2022/078771
§ 371 (c)(1),
(2) Date: Sep. 7, 2023

(87) PCT Pub. No.: WO2022/188670
PCT Pub. Date: Sep. 15, 2022

(65) Prior Publication Data
US 2024/0171482 A1 May 23, 2024

(30) Foreign Application Priority Data
Mar. 9, 2021 (CN) .......................... 202110257753.0

(51) Int. Cl.
*H04L 43/0852* (2022.01)
*H04L 43/026* (2022.01)
*H04L 43/04* (2022.01)

(52) U.S. Cl.
CPC ............ *H04L 43/04* (2013.01); *H04L 43/026* (2013.01)

(58) Field of Classification Search
CPC .... H04L 43/026; H04L 43/04; H04L 43/0852
(Continued)

(56) References Cited

U.S. PATENT DOCUMENTS

2020/0229042 A1 7/2020 Srivastava et al.
2021/0076261 A1* 3/2021 Xin ..................... H04W 28/10
(Continued)

FOREIGN PATENT DOCUMENTS

CN 112422334 A 2/2021

OTHER PUBLICATIONS

International Search Report for International Application No. PCT/CN2022/078771 issued on May 25, 2022 and its English Translation provided by WIPO.
(Continued)

*Primary Examiner* — Jude Jean Gilles
(74) *Attorney, Agent, or Firm* — Ladas & Parry, LLP

(57) ABSTRACT

A network analytics transfer method and apparatus, and a network function entity are provided. The method includes receiving an analytics transfer request, wherein the analytics transfer request is configured to request to transfer first network analytics from a source network function entity to the target network function entity; obtaining analytics aggregation information of the first network analytics according to the analytics transfer request, wherein the analytics aggregation information includes aggregation indication information of one or more first network function sub-entities, and the first network function sub-entities are configured to provide first analytics results to the source network function entity; performing network analytics aggregation according to the analytics aggregation information to obtain an aggregated analytics result of the first network analytics.

20 Claims, 5 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 2023/0188445 A1* | 6/2023 | Xin | ........................ | H04L 41/14 |
| | | | | 709/224 |
| 2023/0239680 A1* | 7/2023 | Park | ....................... | H04L 41/14 |
| | | | | 370/329 |
| 2023/0362199 A1* | 11/2023 | Adam | ................... | H04L 67/303 |

OTHER PUBLICATIONS

Written Opinion for International Application No. PCT/CN2022/078771 issued on May 25, 2022 and its English Translation provided by WIPO.

International Report on Patentibility for International Application No. PCT/CN2022/078771 issued by the International Patent Office on Sep. 12, 2023.

"KI#2—Solving ENs in 8.2 Conclusion on reselection of NWDAF plus some additions," SA WG2 Meeting #142E e-meeting S2-2008443, Nov. 16-20, 2020 (revision of S2-200xxxx), Source: Ericsson, Agenda Item: 8.1.

"Update conclusion for KI#2—Re-selection of NWDAF ," 3GPP TSG-SA WG2 Meeting #142e S2-2008579, Nov. 16-Nov. 20, 2020, eMeeting (revision of ), Source: CATT , Agenda Item: 8.1.

* cited by examiner

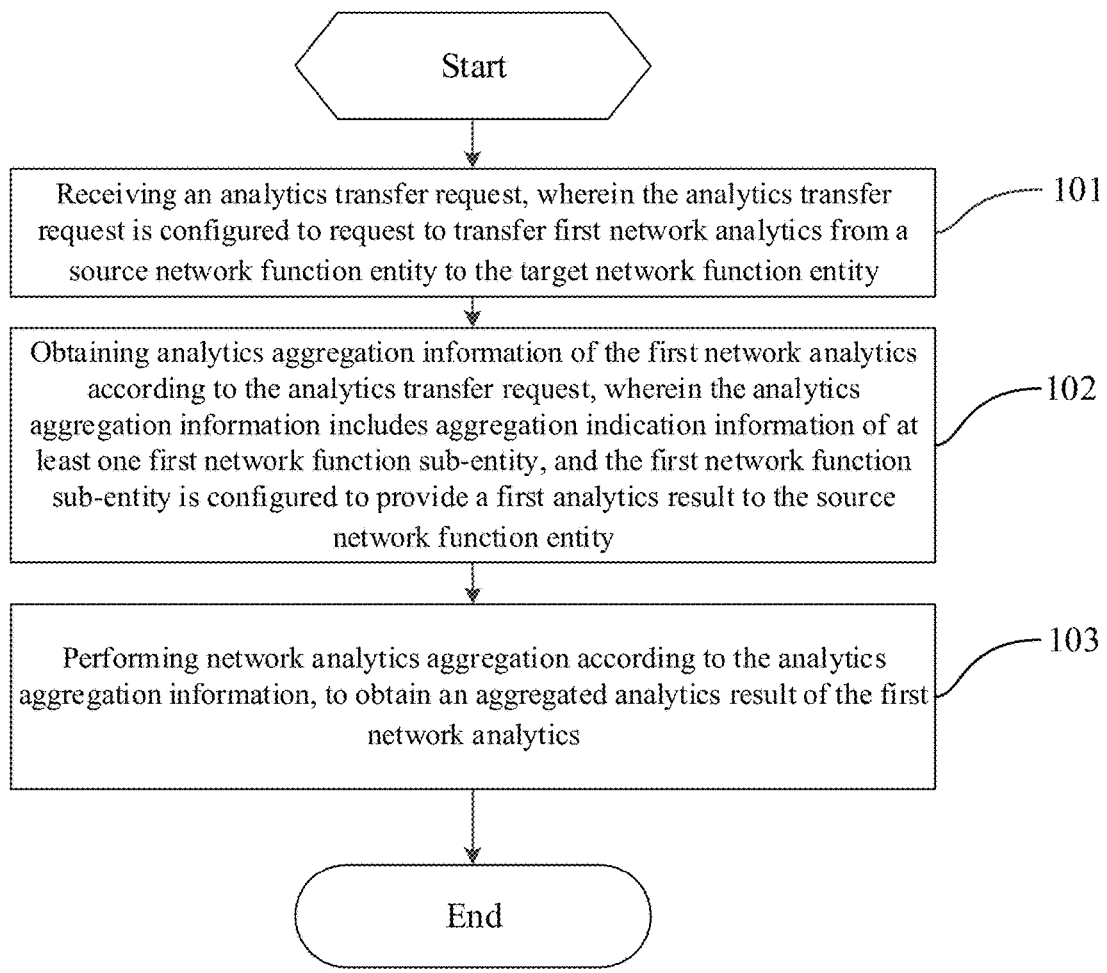

NETWORK ANALYTICS TRANSFER METHOD AND APPARATUS, AND NETWORK FUNCTION ENTITY

CROSS-REFERENCE TO RELATED APPLICATIONS

This application is a U.S. national phase application of a PCT Application No. PCT/CN2022/078771 filed on Mar. 2, 2022, which claims the priority of Chinese Patent Application No. 202110257753.0 filed in China on Mar. 9, 2021, the disclosures of which are incorporated herein by reference in their entireties.

TECHNICAL FIELD

The present disclosure relates to the technical field of communications, and in particular, to a network analytics transfer method, a network analytics transfer apparatus, and a network function entity.

BACKGROUND

In order to realize intelligent analytics and control of a network, a network Data Analytics Function (NWDAF) entity is introduced into the network. The NWDAF entity generally provides network data analytics services, based on artificial intelligence algorithms, for other network function entities through interaction with the other network function entities. The network data analytics services include: collecting network data from the other network function entities as input data, performing model training and inference, deriving analytics information (including statistics and prediction information) for network, and providing the analytics information to the other network function entities.

The NWDAFs may be deployed in a centralized manner, or may be deployed in a distributed manner. When there are a plurality of NWDAFs in a network, an NWDAF (which may be referred to as an Aggregator NWDAF) may subscribe or request analytics information to one or more other NWDAFs (which may be referred to as Distributed NWDAF), and aggregate analytics information from the distributed NWDAFs (i.e., summarizing, merging, and performing certain algorithm processing), thereby providing aggregated analytics information for other network functional entities. This process is referred to as Analytical aggregation. For example, different distributed NWDAFs are configured to provide network data analytics information of different regions of a public land mobile network (PLMN), and the Aggregator NWDAF may aggregate the network data analytics information provided by the plurality of Distributed NWDAFs, thereby providing network data analytics information of an entire PLMN.

During performing network analytics, the NWDAF entity (i.e. source NWDAF) may need to transfer ongoing network analytics to another NWDAF (i.e. target NWDAF) due to certain reasons (such as overload and failure of the source NWDAF, or the analyzed target User Equipment (UE) moving out of the service area wherein the source NWDAF, etc.).

Therefore, how the target NWDAF after the analytics transfer can quickly execute the transferred network analytics is a problem that needs to be solved.

SUMMARY

An objective of the present disclosure is to provide network analytics transfer method, network analytics transfer apparatus and network function entities, to solve the problem that a target NWDAF after the analytics transfer needs to re-construct a data analytics network structure, resulting in an increase of time and related signaling of analytics transfer, or even interruption of the network analytics process.

In order to achieve the above objective, an embodiment of the present disclosure provides a network analytics transfer method performed by a target network function entity, the method includes:
  receiving an analytics transfer request, wherein the analytics transfer request is configured to request to transfer first network analytics from a source network function entity to the target network function entity;
  obtaining analytics aggregation information of the first network analytics according to the analytics transfer request, wherein the analytics aggregation information includes aggregation indication information of one or more first network function sub-entities, and the one or more first network function sub-entities are configured to provide one or more first analytics results to the source network function entity;
  performing network analytics aggregation according to the analytics aggregation information to obtain an aggregated analytics result of the first network analytics.

The aggregation indication information includes one or more identifiers of the one or more first network function sub-entities or one or more addresses of the one or more first network function sub-entities.

The analytics aggregation information is included within a context of the first network analytics.

The context of the first network analytics further includes at least one of the following:
  Analytics Identity (ID);
  network element entity information of a network element entity corresponding to the Analytics ID and providing network data;
  network data corresponding to the Analytics Identity;
  a first analytics result corresponding to the Analytics Identity;
  a third analytics result corresponding to the Analytics identity, wherein the third analytics result is an analytics result of the first network analytics output by the source network function entity; wherein the analytics identity is configured to indicate a type of analytics information included in the first network analytics.

Obtaining the analytics aggregation information of the first network analytics according to the analytics transfer request includes:
  obtaining the analytics aggregation information from the source network function entity according to the analytics transfer request; or
  obtaining the analytics aggregation information from a Data Repository Function (DRF) entity or a Data Collection Coordination Function (DCCF) entity according to the analytics transfer request.

Performing the network analytics aggregation according to the analytics aggregation information to obtain the aggregated analytics result of the first network analytics includes:
  obtaining, according to the analytics aggregation information, one or more first analytics results provided by the one or more first network function sub-entities and related to the first network analytics;
  performing an aggregation operation according to the one or more first analytics results to obtain the aggregated analytics result.

Before performing the aggregation operation according to the one or more first analytics results to obtain the aggregated analytics result, the method further includes:

obtaining, according to the analytics aggregation information and/or a local policy, a second analytics result provided by a second sub-network function entity and related to the first network analytics;

performing the aggregation operation according to the one or more first analytics results to obtain the aggregated analytics result includes: aggregating the one or more first analytics results and the second analytics result to obtain the aggregated analytics result.

The aggregation indication information further includes analytics aggregation description information of the one or more first network function sub-entities, obtaining, according to the analytics aggregation information, one or more first analytics results provided by the one or more first network function sub-entities and related to the first network analytics includes:

obtaining the one or more first analytics results provided by the one or more first network function sub-entities and related to the first network analytics, if the analytics aggregation description information of the one or more first network function sub-entities meets network analytics aggregation requirement of the target network function entity.

Obtaining, according to the analytics aggregation information, the one or more first analytics results provided by the one or more first network function sub-entities and related to the first network analytics includes:

sending, according to the analytics aggregation information, the analytics aggregation description information of the target network function entity to the one or more first network function sub-entities; and obtaining the one or more first analytics results related to the first network analytics and provided to the target network function entity by the one or more first network function sub-entities based on the analytics aggregation description information of the target network function entity.

In order to achieve the above objective, an embodiment of the preset disclosure provides further a network analytics transfer method performed by a source network function entity, the method includes:

sending an analytics transfer request to a target network function entity, wherein the analytics transfer request is configured to request to transfer first network analytics from the source network function entity to the target network function entity, so that the target network function entity obtains analytics aggregation information of the first network analytics according to the analytics transfer request, and performs network analytics aggregation according to the analytics aggregation information to obtain an aggregated analytics result of the first network analytics, wherein the analytics aggregation information includes aggregation indication information of one or more first network function sub-entities, and the one or more first network function sub-entities are configured to provide one or more first analytics results to the source network function entity.

The analytics transfer request includes the analytics aggregation information, or the analytics transfer request includes a first identifier, so that the target network function entity requests the analytics aggregation information from a Data Repository Function (DRF) entity or a Data Collection Coordination Function (DCCF) entity according to the first identifier.

In order to achieve the above objective, an embodiment of the preset disclosure provides further a target network function entity. The entity includes: a memory, a transceiver, and a processor, wherein the memory is configured to store a computer program; the transceiver is configured to transmit and receive data under control of the processor, and the processor is configured to read the computer program in the memory and execute following operations:

receiving an analytics transfer request through the transceiver, wherein the analytics transfer request is configured to request to transfer first network analytics from a source network function entity to the target network function entity;

obtaining analytics aggregation information of the first network analytics according to the analytics transfer request, wherein the analytics aggregation information includes aggregation indication information of one or more first network function sub-entities, and the one or more first network function sub-entities are configured to provide one or more first analytics results to the source network function entity;

performing network analytics aggregation according to the analytics aggregation information to obtain an aggregated analytics result of the first network analytics.

The aggregation indication information includes one or more identifiers of the one or more first network function sub-entities or one or more addresses of the one or more first network function sub-entities.

The analytics aggregation information is included within a context of the first network analytics.

The context of the first network analytics further includes at least one of the following:

Analytics Identity (ID);

network element entity information of a network element entity corresponding to the Analytics ID and providing network data;

network data corresponding to the Analytics Identity;

a first analytics result corresponding to the Analytics Identity;

a third analytics result corresponding to the Analytics identity, wherein the third analytics result is an analytics result of the first network analytics output by the source network function entity; wherein the analytics identity is configured to indicate a type of analytics information included in the first network analytics.

The processor is configured to read the program instructions in the memory and execute following operations:

obtaining the analytics aggregation information from the source network function entity according to the analytics transfer request; or obtaining the analytics aggregation information from a Data Repository Function (DRF) entity or a Data Collection Coordination Function (DCCF) entity according to the analytics transfer request.

The processor is configured to read the program instructions in the memory and perform following operations:

obtaining, according to the analytics aggregation information, one or more first analytics results provided by the one or more first network function sub-entities and related to the first network analytics;

performing an aggregation operation according to the one or more first analytics results to obtain the aggregated analytics result.

The processor is configured to read program instructions in the memory and perform following operations:
- obtaining, according to the analytics aggregation information and/or a local policy, a second analytics result provided by a second sub-network function entity and related to the first network analytics;
- aggregating the one or more first analytics results and the second analytics result to obtain the aggregated analytics result.

The aggregation indication information further includes analytics aggregation description information of the one or more first network function sub-entities, the processor is configured to read the program instructions in the memory and execute following operations:
- obtaining, according to the analytics aggregation information, one or more first analytics results provided by the one or more first network function sub-entities and related to the first network analytics includes:
  - obtaining the one or more first analytics results provided by the one or more first network function sub-entities and related to the first network analytics, if the analytics aggregation description information of the one or more first network function sub-entities meets network analytics aggregation requirement of the target network function entity.

The processor is configured to read program instructions in the memory and perform the following operations:
- sending, according to the analytics aggregation information, the analytics aggregation description information of the target network function entity to the one or more first network function sub-entities; and
- obtaining the one or more first analytics results related to the first network analytics and provided to the target network function entity by the one or more first network function sub-entities based on the analytics aggregation description information of the target network function entity.

In order to achieve the above objective, an embodiment of the present application further provides a network analytics transfer apparatus, the apparatus includes:
- a receiving unit, configured to receive an analytics transfer request, wherein the analytics transfer request is configured to request to transfer first network analytics from a source network function entity to the target network function entity;
- an obtaining unit, configured to obtain analytics aggregation information of the first network analytics according to the analytics transfer request, wherein the analytics aggregation information includes aggregation indication information of one or more first network function sub-entities, and the one or more first network function sub-entities are configured to provide one or more first analytics results to the source network function entity; and
- an aggregation processing unit, configured to perform network analytics aggregation according to the analytics aggregation information to obtain an aggregated analytics result of the first network analytics.

The aggregation indication information includes one or more identifiers of the one or more first network function sub-entities or one or more addresses of the one or more first network function sub-entities.

The analytics aggregation information is included within a context of the first network analytics.

The obtaining unit is specifically configured to:
- obtain the analytics aggregation information from the source network function entity according to the analytics transfer request; or
- obtain the analytics aggregation information from a Data Repository Function (DRF) entity or a Data Collection Coordination Function (DCCF) entity according to the analytics transfer request.

The aggregation processing unit is specifically configured to:
- obtain, according to the analytics aggregation information, one or more first analytics results provided by the one or more first network function sub-entities and related to the first network analytics;
- perform an aggregation operation according to the one or more first analytics results to obtain the aggregated analytics result.

The aggregation processing unit is specifically configured to:
- before performing the aggregation operation according to the one or more first analytics results to obtain the aggregated analytics result, obtain, according to the analytics aggregation information and/or a local policy, a second analytics result provided by a second sub-network function entity and related to the first network analytics;
- aggregate the one or more first analytics results and the second analytics result to obtain the aggregated analytics result.

The aggregation indication information further includes analytics aggregation description information of the one or more first network function sub-entities, the aggregation processing unit is specifically configured to:
- obtain the one or more first analytics results provided by the one or more first network function sub-entities and related to the first network analytics, if the analytics aggregation description information of the one or more first network function sub-entities meets network analytics aggregation requirement of the target network function entity.

The aggregation processing unit is specifically configured to:
- send, according to the analytics aggregation information, the analytics aggregation description information of the target network function entity to the one or more first network function sub-entities; and
- obtain the one or more first analytics results related to the first network analytics and provided to the target network function entity by the one or more first network function sub-entities based on the analytics aggregation description information of the target network function entity.

In order to achieve the above objective, an embodiment of the present application further provides a source network function entity, the entity includes: a memory, a transceiver, and a processor, wherein the memory is configured to store a computer program; the transceiver is configured to transmit and receive data under control of the processor, and the processor is configured to read the computer program in the memory and perform following operations:
- sending an analytics transfer request to a target network function entity through the transceiver, wherein the analytics transfer request is configured to request to transfer first network analytics from the source network function entity to the target network function entity, so that the target network function entity obtains analytics aggregation information of the first network analytics according to the analytics transfer request, and performs network analytics aggregation according to the analytics aggregation information to obtain an aggregated analytics result of the first network analytics, wherein the analytics aggregation information includes aggregation indication information of one or more first network function sub-entities, and the one or more first network function sub-entities are configured to provide one or more first analytics results to the source network function entity.

The analytics transfer request includes the analytics aggregation information, or the analytics transfer request includes a first identifier, so that the target network function entity requests the analytics aggregation information from a Data Repository Function (DRF) entity or a Data Collection Coordination Function (DCCF) entity according to the first identifier.

In order to achieve the above objective, an embodiment of the present application further provides a network analytics transfer apparatus, the apparatus includes:

a sending unit, configured to send an analytics transfer request to a target network function entity, wherein the analytics transfer request is configured to request to transfer first network analytics from the source network function entity to the target network function entity, so that the target network function entity obtains analytics aggregation information of the first network analytics according to the analytics transfer request, and performs network analytics aggregation according to the analytics aggregation information to obtain an aggregated analytics result of the first network analytics, wherein the analytics aggregation information includes aggregation indication information of one or more first network function sub-entities, and the one or more first network function sub-entities are configured to provide one or more first analytics results to the source network function entity.

The analytics transfer request includes the analytics aggregation information, or the analytics transfer request includes a first identifier, so that the target network function entity requests the analytics aggregation information from a Data Repository Function (DRF) entity or a Data Collection Coordination Function (DCCF) entity according to the first identifier.

In order to achieve the above objective, an embodiment of the present application further provides a processor-readable storage medium, wherein the processor-readable storage medium stores a computer program, and the computer program is configured to cause a processor to execute steps of the network analytics transfer method described above.

The above technical solutions of the present disclosure have at least the following beneficial effects:

In the above technical solutions of the embodiments of the present disclosure, the analytics transfer request is received by the target network function entity, and the analytics transfer request is configured to request to transfer the first network analytics from the source network function entity to the target network function entity. Analytics aggregation information of the first network analytics is obtained according to the analytics transfer request, wherein the analytics aggregation information includes aggregation indication information of one or more network function sub-entities, and the one or more network function sub-entities are network function sub-entities that provide a first analytics result to the source network function entity; and network analytics aggregation is executed according to the analytics aggregation information to obtain an aggregated analytics result of the first network analytics, so that the target network function entity performs network analytics aggregation according to the obtained analytics aggregation information of the first network analytics. The aggregated analytics result of the first network analytics can be obtained, so that the related analytics transfer time can be shortened, the related signaling is reduced, the system resources are saved, and the network data analytics service is ensured not to be interrupted.

BRIEF DESCRIPTION OF THE DRAWINGS

FIG. 1 is a first schematic flowchart of a network analytics transfer method according to some embodiments of the present disclosure;

FIG. 2 is a second schematic flowchart of a network analytics transfer method according to some embodiments of the present disclosure;

DETAILED DESCRIPTION

Figure 3:
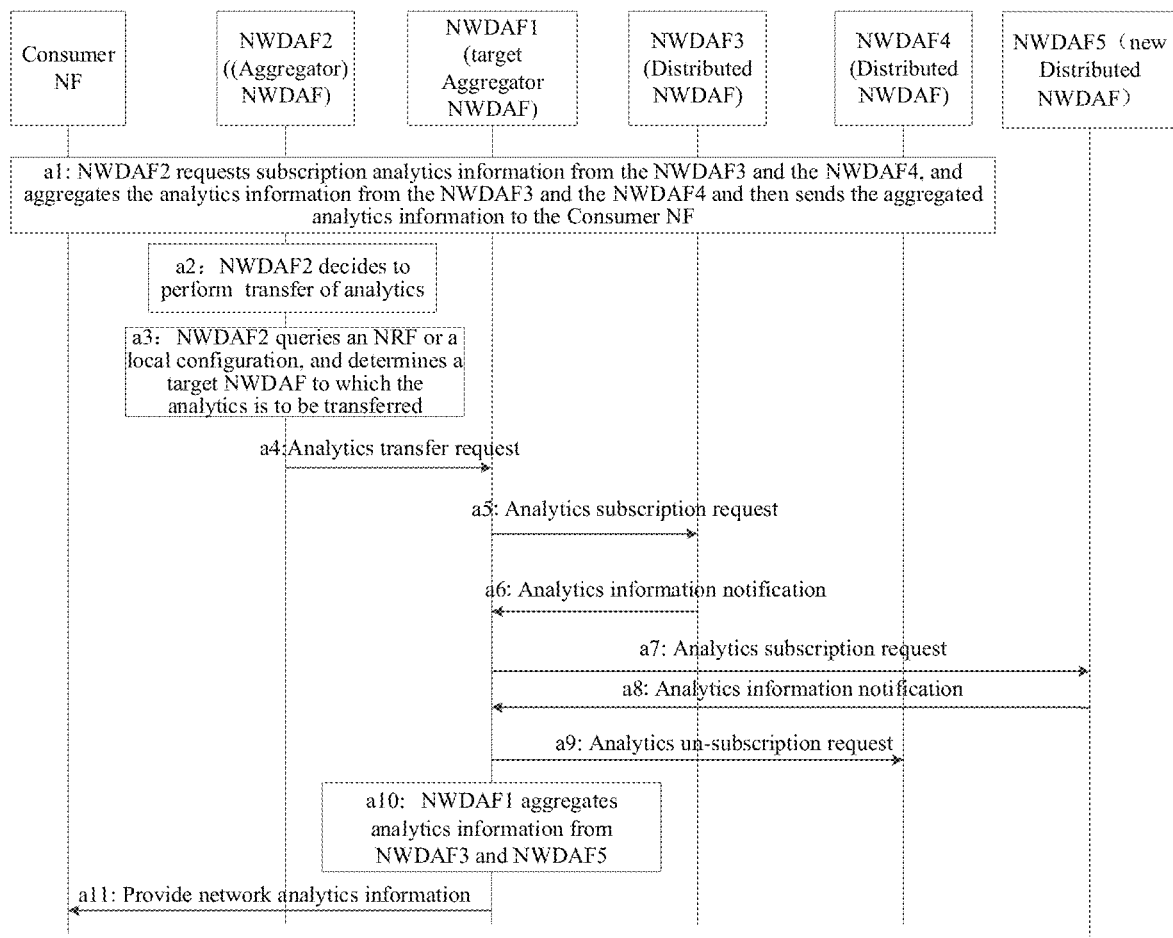
FIG. 3 is a third schematic flowchart of a network analytics transfer method according to some embodiments of the present disclosure.

In the embodiments of the present disclosure, a term "and/or" describes an association relationship of associated objects, and indicates that there may be three relationship types, for example, A and/or B may indicate that A exists alone, both A and B exist, and B exists alone. A character "/" generally indicates that the associated objects have "or" relationship therebetween.

In the embodiments of the present disclosure, a term "a plurality of" means two or more, and other quantifiers are similar to each other.

The related network analytics transfer technology is applied to an analytics aggregation scenario, that is, when an Aggregator NWDAF transfers ongoing analytics to another NWDAF, there are some defects: if the new NWDAF after the transfer needs to provide network analytics information to a Consumer Network Function (Consumer NF) through aggregating analytics information of a plurality of NWDAFs, then the new NAWDAF needs to re-discover and select a Distributed NWDAF, and the newly selected Distributed NWDAF needs to determine NFs collecting data, a result of which is that analytics transfer time and related signaling can be increased, or even resulting in interruption of a network analytics process.

The technical solutions in the embodiments of the present disclosure will be clearly and completely described below with reference to the accompanying drawings in the embodiments of the present disclosure. Obviously, the described embodiments are merely some, rather than all, of the embodiments of the present disclosure. All other embodiments obtained by a person of ordinary skill in the art based on the embodiments of the present disclosure without creative efforts shall fall within the protection scope of the present disclosure.

Embodiments of the present disclosure provide a network analytics transfer method and a network analytics transfer method apparatus. The method and the apparatus are based on the same application concept, and implementation of the apparatus and the method may refer to each other due to similar principles of solving the problem by the method and the apparatus, and repeated details are not described herein again.

As shown in FIG. 1 which is a schematic flowchart of a network analytics transfer method provided by some embodiments of the present disclosure, the method is applied to a target network function entity, and the method includes steps 101-103.

Step 101: receiving an analytics transfer request, wherein the analytics transfer request is configured to request to transfer first network analytics from a source network function entity to the target network function entity. In this step, the embodiment may be applied to an analytics aggregation scenario. The target network function entity may be an Aggregator NWDAF, and the source network function entity may be an Aggregator NWDAF. It should be noted that the first network analytics is ongoing network analytics that the source network function entity is performing.

Step 102: obtaining analytics aggregation information of the first network analytics according to the analytics transfer request, wherein the analytics aggregation information includes aggregation indication information of at least one first network function sub-entity, and the first network function sub-entity is configured to provide a first analytics result to the source network function entity. In this step, a network area served by the source network function entity covers network areas served by the at least one first network function sub-entity, that is, the network areas served by the at least one first network function sub-entity are sub-areas of the network area served by the source network function entity.

The analytics aggregation information includes the aggregation indication information of at least one first network function sub-entity, and functions to provide a basis for network analytics aggregation for the target network function entity. When it is determined according to the analytics aggregation information that the first network analytics transferred from the first network function sub-entity continues to be used, analytics transfer time related to the target network function entity can be shortened, related signaling is reduced, system resources are saved, and it is ensured that a network data analytics service is not interrupted.

It should be noted that the at least one first network function sub-entity provides one or more first analytics results to the source network function entity, so that the source network function entity aggregates the one or more first analytics results, to obtain an analytics result when the source network function entity performs the first network analytics.

Step 103: performing network analytics aggregation according to the analytics aggregation information, to obtain an aggregated analytics result of the first network analytics. In this step, if the aggregated analytics result of the first network analytics is that the first network analytics is transferred to the target network function entity, the target network function entity performs the analytics result of the first network analytics.

It should be noted that the above-mentioned analytics result may also be referred to as analytics information.

According to the network analytics transfer method of the embodiments of the present disclosure, an analytics transfer request is received by the target network function entity, and the analytics transfer request is configured to request to transfer the first network analytics from the source network function entity to the target network function entity, and analytics aggregation information of the first network analytics is obtained according to the analytics transfer request, wherein the analytics aggregation information includes aggregation indication information of one or more network function sub-entities, and the one or more network function sub-entities are one or more network function sub-entities that provide a first analytics result to the source network function entity; and network analytics aggregation is performed according to the analytics aggregation information, to obtain an aggregated analytics result of the first network analytics. As a result, the target network function entity performs network analytics aggregation according to the obtained analytics aggregation information of the first network analytics, the aggregated analytics result of the first network analytics can be obtained, and the related analytics transfer time can be shortened, the related signaling is reduced, the system resources are saved, and it is ensured that the network data analytics service is not interrupted.

In another implementation of the present disclosure, the aggregation indication information includes one or more identifiers of the one or more first network function sub-entities or one or more addresses of the one or more first network function sub-entities.

In another implementation of the present disclosure, the analytics aggregation information is included in the context of the first network analytics, and the context of the first network analytics further includes at least one of the following:

Analytics Identity (ID);

network element entity information of a network element entity corresponding to the Analytics ID and providing network data; here, the network element entity information may include, but is not limited to: an identifier or an address of a network element entity, data acquisition requirement (such as time, a period, etc.) corresponding to the network element entity; here, the network element entity may be a function entity that provides mobility management and/or session management in a network, for example, an Access and Mobility Management Function (AMF) entity, a Session Management Function (SMF) entity, etc.;

network data corresponding to the analytics identity; here, the network data may be network data collected by the source network function entity and/or the one or more first network function sub-entities; specifically, the network data collected by the source network function entity may be data content or a data address collected by the source network function entity, wherein the data address may be represented in a form of a Uniform Resource Locator (URL) or a Fully Qualified Domain Name (FQDN);

a first analytics result corresponding to the analytics identity; here, the first analytics result is an analytics result output by the one or more first network function sub-entities; it should be noted that the analytics result output by the one or more first network function sub-entities may include an analytics result which is output by the one or more first network function sub-entities and has not been sent to other network function entities (such as a Consumer NF entity);

a third analytics result corresponding to the analytics identity, wherein the third analytics result is an analytics result of the first network analytics output by the source network function entity; specifically, the third analytics result output by the source network function entity may include the analytics information content or the analytics information address; the analytics information address may be represented in the form of the URL or the FQDN; it should be noted that the third analytics result output by the source network function entity may include an analytics result which is output by the source network function entity and has not been sent to other network function entities (such as a Consumer NF entity).

The analytics identity is configured to indicate the type of the analytics information included in the first network analytics.

It should be noted that the number of the analytics identities is greater than or equal to one.

For example, Analytics ID="Service Experience Analytics", Analytics ID="UE Mobility Analytics".

As an optional implementation, obtaining analytics aggregation information of the first network analytics according to the analytics transfer request in the step 102 of the method of the embodiments of the present application includes:

requesting the analytics aggregation information from the source network function entity according to the analytics transfer request; wherein, in this implementation, a third request is sent to the source network function entity according to the analytics transfer request, and the analytics aggregation information sent by the source network function entity according to the third request is received; or according to the analytics transfer request, requesting the analytics aggregation information from a Data Repository Function (DRF) entity or a Data Collection Coordination Function (DCCF) entity.

In this implementation, the analytics aggregation information of the first network analytics is pre-stored in the DRF entity.

Specifically, one way is to send a fourth request to the DRF entity through the analytics transfer request, and receive analytics aggregation information sent by the DRF entity according to the fourth; another way is to send a fifth request to the DCCF entity through the analytics transfer request, so that the DCCF entity sends a sixth request to the DRF entity according to the fifth request and receives the analytics aggregation information sent according to the sixth request by the DRF entity, and to return the received analytics aggregation information to the target network function entity.

Here, that is to say, the target network function entity obtains the analytics aggregation information through the DCCF entity.

In this implementation, the analytics transfer request includes a first identifier, and the target network function entity obtains the analytics aggregation information from the Data Repository Function (DRF) entity or the Data Collection Coordination Function (DCCF) entity according to the first identifier.

In another implementation of the present disclosure, the first identifier is a context identifier of the first network analytics, and the analytics aggregation information is included in the context of the first network analytics.

In another optional implementation, the analytics transfer request includes the analytics aggregation information; and the target network function entity may directly obtain the analytics aggregation information according to the analytics transfer request.

In this implementation, in another implementation of the present disclosure, the analytics transfer request includes the context of the first network analytics, and the context of the first network analytics includes the analytics aggregation information. The analytics transfer request may further include: an analytics transfer instruction, information related to network analytics subscription of requesting to transfer to the target network function entity, etc.

As an optional implementation, in the step 103 of the method of the embodiments of the present disclosure, performing network analytics aggregation according to the analytics aggregation information, to obtain an aggregated analytics result of the first network analytics includes: obtaining, according to the analytics aggregation information, a first analytics result provided by the one or more first sub-network functional entities and related to the first network analytics.

This step may specifically include:

sending a first request to the one or more first network function sub-entities according to the analytics aggregation information, wherein the first request is configured to request the one or more first network function sub-entities to provide the first analytics result related to the first network analytics to the target network function entity.

Here, the target network function entity continues to use a network function entity, i.e., the first network function sub-entity, that provides the analytics result to the source network function entity, so that the first network function sub-entity provides the first analytics result related to the first network analytics to the target network function entity.

In another implementation of the present disclosure, the first request includes parameter information indicating that analytics information corresponding to the at least one analytics identity subscribed by the source network function entity is transferred to the target network function entity. For example, Analytics Transfer Indication="1"; Source Network Function (Source NWDAF)="NWDAF1 ID"; Analytics ID [1]="Service Experience"; Analytics ID [2]="UE Mobility", representing that the analytics information of service experience and UE mobility subscribed by the source network function (Source NWDAF) entity to the first network function sub-entity is transferred to the target network function entity, that is, the target network function entity replaces the source network function entity to subscribe related analytics information.

The first analytics result related to the first network analytics sent by the first network function sub-entity according to the first request is obtained.

Here, in another implementation of the present disclosure, the first request includes some or all of the context of the first network analytics.

The step further includes: performing an aggregation operation according to the first analytics result to obtain an aggregated analytics result.

Here, when the target network function entity continues to use the first network function sub-entity and no new network function sub-entity needs to be selected, the one or more first analytics results output by the one or more first network function sub-entities are aggregated to obtain the aggregated analytics result.

In an optional implementation, before performing the aggregation operation according to the first analytics result to obtain the aggregated analytics result, the method in the embodiments of the present disclosure may further include:

acquiring, according to the analytics aggregation information and/or a local policy, a second analytics result provided by a second sub-network function entity and related to the first network analytics.

It should be noted that the second network function sub-entity is a new network function sub-entity selected by the target network function entity according to the analytics aggregation information and/or the local policy, and is configured to provide an analytics result of network analytics to the target network function entity.

This step may specifically include:

sending a second request to the second network function sub-entity according to the analytics aggregation information and/or the local policy, wherein the second request is configured to request the second network function sub-entity to provide a second analytics result related to the first network analytics to the target network function entity;

obtaining a second analytics result related to the first network analytics sent by the second network function sub-entity according to the second request.

In another implementation of the present disclosure, the second request includes some or all of information of the context of the first network analytics.

It should be noted that some or all of the information of the context of the first network analytics may be: for example, data collected by and/or an analytics result output by the source network function entity and/or the first network function sub-entity, for at least one analytics identity. Here, some or all of the information of the context of the first network analytics may assist the second sub-network function entity in performing network analytics, for example, training and optimizing a model, improving real-time performance and accuracy of the analytics.

Correspondingly, performing the aggregation operation according to the first analytics result to obtain the aggregated analytics result includes:

aggregating the first analytics result and the second analytics result to obtain the aggregated analytics result.

In an optional implementation, the aggregation indication information further includes analytics aggregation description information of the first network function sub-entity.

Correspondingly, obtaining, according to the analytics aggregation information, the first analytics result provided by the first network function sub-entity and related to the first network analytics, including:

obtaining the first analytics result related to the first network analytics provided by the first network function sub-entity when the analytics aggregation description information of the first network function sub-entity meets network analytics aggregation requirement of the target network function entity.

Here, "the analytics aggregation description information of the first network function sub-entity meets network analytics aggregation requirement of the target network function entity" means that the first network function sub-entity may continue to be used to provide the first analytics result related to the first network analytics provided to the target network function entity.

Here, the analytics aggregation description information is configured to represent the provided data and/or characteristics of the analytics information used for aggregation. Specifically, the analytics aggregation information includes at least one or more of the following:

sampling time; area; location; data format; accuracy; sampling rate.

Here, the analytics aggregation description information may be aggregation metadata (or referred to as analytics metadata).

It should be noted that, in case of determining to continue to use the first analytics result related to the first network analytics provided by the first network function sub-entity, the target network function entity may directly perform, by using the analytics aggregation description information of the first network function sub-entity, aggregation processing on analytics information subsequently provided by the first network function sub-entity, but does not need to request the analytics aggregation description information of the first network function sub-entity from the first network function sub-entity again.

It should be noted that, in case that the analytics aggregation description information of the first network function sub-entity does not meet the network analytics aggregation requirement of the target network function entity, it is determined that the first analytics result related to the first network analytics provided by the first network function sub-entity is no longer used.

Certainly, if the analytics aggregation information does not conform to the local policy (for example, security requirements, etc.), it is determined that the first analytics result related to the first network analytics provided by the first network function sub-entity is no longer used.

In the case that it is determined that the first analytics result related to the first network analytics provided by the first network function sub-entity is no longer used, the target network function entity may select a new network function entity, i.e., the second network function sub-entity, for the first network analytics by querying the Network Repository Function (NRF) entity, the second network function sub-entity replaces the first network function sub-entity which is not used any longer, to provide the second analytics result related to the first network analytics.

In an optional implementation, obtaining, according to the analytics aggregation information, the first analytics result provided by the first network function sub-entity and related to the first network analytics includes: sending, according to the analytics aggregation information, analytics aggregation description information of the target network function entity to the first network function sub-entity; and obtaining the first analytics result related to the first network analytics and provided by the first network function sub-entity based on the analytics aggregation description information of the target network function entity to the target network function entity.

Sending, according to the analytics aggregation information, the analytics aggregation description information of the target network function entity to the first network function sub-entity specifically includes: determining, according to analytics aggregation information, the first network function sub-entity capable of providing an analytics result of network analytics to the target network function entity; and sending the analytics aggregation description information of the target network function entity to the first network function sub-entity.

It should be noted that the analytics aggregation description information of the target network function entity may be aggregation metadata (also referred to as analytics metadata) of the target network function entity, and may include, for example, updated data and/or an analytics information aggregation mode (aggregating according to a region/location, time, slice, UE, or a NF subset), a format, a precision, a sampling rate, etc.

Here, in the case that the analytics aggregation description information of the target network function entity is different from the analytics aggregation description information of the source network function entity, the analytics aggregation description information of the target network function entity is sent to the first network function sub-entity. In this way, the first network function sub-entity provides the first analytics result related to the first network analytics to the target network function entity according to the new analytics aggregation description information, that is, the analytics aggregation description information of the target network function entity.

In an optional implementation, obtaining, according to the analytics aggregation information and/or the local policy, the second analytics result related to the first network analytics provided by the second network function sub-entity includes:
    sending analytics aggregation description information of the target network function entity to the second network function sub-entity according to the analytics aggregation information and/or the local policy;
    obtaining a second analytics result related to the first network analytics and provided by the second network function sub-entity to the target network function entity based on analytics aggregation description information of the second network function sub-entity.

Sending the analytics aggregation description information of the target network function entity to the second network function sub-entity according to the analytics aggregation information and/or the local policy specifically includes: determining, according to the analytics aggregation information and/or the local policy, the second network function sub-entity capable of providing an analytics result of network analytics to the target network function entity; and sending the analytics aggregation description information of the target network function entity to the second network function sub-entity.

It should be noted that the second network function sub-entity is a newly selected network function sub-entity.

In an optional implementation, the analytics transfer request further includes information of a user network function entity, and is configured to indicate that the user network function entity requests to receive the aggregated analytics result of the first network analytics from the target network function entity. In the step 101 of the method in the embodiments of the present disclosure, receiving an analytics transfer request, includes:
    receiving the analytics transfer request from the source network function entity; or
    receiving the analytics transfer request from the user network function entity.

In this implementation, the user network function entity does not have a network data analytics function, and generally, the user network function entity is a Consumer NF entity.

Here, the analytics transfer request is received from the source network function entity, that is, the analytics transfer request sent by the source network function entity is received. That is, the analytics transfer request is triggered by the source network function entity.

Receiving the analytics transfer request from the user network function entity may specifically include:
    receiving the analytics transfer request sent by the user network function entity; or
    receiving the analytics transfer request sent by the user network function entity via the source network function entity.

Here, receiving the analytics transfer request sent by the target network function entity through the source network function entity may specifically include:
    receiving an analytics transmission request sent from the user network function entity by the source network function entity, and receiving the analytics transfer request sent according to the analytics transmission request from the source network function entity by the target network function entity.

Based on this, as an optional implementation manner, after performing network analytics aggregation according to the analytics aggregation information to obtain the aggregated analytics result of the first network analytics, the method in the embodiments of the present disclosure further includes:
    providing the aggregated analytics result of the first network analytics to the user network function entity.

According to the network analytics transfer method of the embodiments of the present disclosure, the analytics transfer request is received by the target network function entity, and the analytics transfer request is configured to request to transfer the first network analytics from the source network function entity to the target network function entity. analytics aggregation information of the first network analytics is obtained according to the analytics transfer request, wherein the analytics aggregation information includes aggregation indication information of one or more network function sub-entities, and the one or more network function sub-entities are network function sub-entities that provide a first analytics result to the source network function entity; and network analytics aggregation is executed according to the analytics aggregation information to obtain an aggregated analytics result of the first network analytics, so that the target network function entity performs network analytics aggregation according to the obtained analytics aggregation information of the first network analytics. According to the method, the aggregated analytics result of the first network analytics can be obtained, so that the related analytics transfer time can be shortened, the related signaling is reduced, the system resources are saved, and the network data analytics service is ensured not to be interrupted.

As shown in FIG. 2 which a schematic flowchart of a network analytics transfer method provided by some embodiments of the present disclosure, the method is applied to a source network function entity, and the method includes:

Step 201: sending an analytics transfer request to a target network function entity, wherein the analytics transfer request is configured to request to transfer first network analytics from a source network function entity to the target network function entity, so that the target network function entity obtains analytics aggregation information of the first network analytics according to the analytics transfer request, and performs network analytics aggregation according to the analytics aggregation information, to obtain an aggregated analytics result of the first network analytics, wherein the analytics aggregation information includes aggregation indication information of one or more first network function sub-entities, and the one or more first network function sub-entities are configured to provide one or more first analytics results to the source network function entity.

In this step, the embodiment may be applied to an analytics aggregation scenario. The target network function entity may be an Aggregator NWDAF, and the source network function entity may be an Aggregator NWDAF.

In the case that the source network function entity determines to perform the analytics transfer, the analytics transfer request may be sent to the target network function entity.

The network analytics transfer method according to some embodiments of the present disclosure sends the analytics transfer request to the target network function entity, wherein the analytics transfer request is configured to request to transfer the first network analytics from the source network function entity to the target network function entity, so that the target network function entity obtains analytics aggregation information of the first network analytics according to the analytics transfer request, and performs network analytics aggregation according to the analytics aggregation information, to obtain an aggregated analytics result of the first network analytics, the analytics aggregation information includes aggregation indication information of one or more first network function sub-entities, and the one or more first network function sub-entities are configured to provide one or more first analytics results to the source network function entity The source network function entity sends the analytics transfer request to the target network function entity, so that the target network function entity performs network analytics aggregation according to the analytics aggregation information of the first network analytics obtained through the analytics transfer request, and the aggregated analytics result of the first network analytics can be obtained, the related analytics transfer time can be shortened, the related signaling is reduced, the system resources are saved, and the network data analytics service is ensured not to be interrupted.

In another implementation of the present disclosure, the aggregation indication information includes an identifier of the first network function sub-entity or an address of the first network function sub-entity.

In another implementation of the present disclosure, the analytics transfer request includes the analytics aggregation information, or the analytics transfer request includes a first identifier, so that the target network function entity requests the analytics aggregation information from a Data Repository Function (DRF) entity or a Data Collection Coordination Function (DCCF) entity according to the analytics transfer request.

As an optional implementation, after sending the analytics transfer request to the target network function entity, the method in the embodiments of the present disclosure further includes:
  receiving a third request sent by the target network function entity according to the analytics transfer request;
  sending the analytics aggregation information to the target network function entity according to the third request.

As an optional implementation, the analytics aggregation information is included in the context of the first network analytics, and the context of the first network analytics further includes at least one of the following:
  Analytics Identity (ID);
  network element entity information of a network element entity corresponding to the Analytics ID and providing network data; here, the network element entity information may include, but is not limited to: an identifier or an address of a network element entity, data acquisition requirement (such as time, a period, etc.) corresponding to the network element entity; here, the network element entity may be a function entity that provides mobility management and/or session management in a network, for example, an Access and Mobility Management Function (AMF) entity, a Session Management Function (SMF) entity, etc.;
  network data corresponding to the analytics identity; here, the network data may be network data collected by the source network function entity and/or the one or more first network function sub-entities; specifically, the network data collected by the source network function entity may be data content or a data address collected by the source network function entity, wherein the data address may be represented in a form of a Uniform Resource Locator (URL) or a Fully Qualified Domain Name (FQDN);
  a first analytics result corresponding to the analytics identity; here, the first analytics result is an analytics result output by the one or more first network function sub-entities; it should be noted that the analytics result output by the one or more first network function sub-entities may include an analytics result which is output by the one or more first network function sub-entities and has not been sent to other network function entities (such as a Consumer NF entity);
  a third analytics result corresponding to the analytics identity, wherein the third analytics result is an analytics result of the first network analytics output by the source network function entity; specifically, the third analytics result output by the source network function entity may include the analytics information content or the analytics information address; the analytics information address may be represented in the form of the URL or the FQDN; it should be noted that the third analytics result output by the source network function entity may include an analytics result which is output by the source network function entity and has not been sent to other network function entities (such as a Consumer NF entity).

The analytics identity is configured to indicate the type of the analytics information included in the first network analytics.

It should be noted that the number of the analytics identities is greater than or equal to one.

For example, Analytics ID="Service Experience Analytics", Analytics ID="UE Mobility".

For example, Analytics ID="Service Experience", Analytics ID="UE Mobility".

As an optional implementation, before sending the analytics transfer request to the target network function entity, the method in the embodiments of the present disclosure further includes:
  storing the analytics aggregation information of the first network analytics to a Data Repository Function (DRF) entity; or
  storing the analytics aggregation information of the first network analytics to the DRF entity through a Data Collection Coordination Function (DCCF) entity.

The network analytics transfer method according to some embodiments of the present disclosure sends the analytics transfer request to the target network function entity, wherein the analytics transfer request is configured to request to transfer the first network analytics from the source network function entity to the target network function entity, so that the target network function entity obtains analytics aggregation information of the first network analytics according to the analytics transfer request, and performs network analytics aggregation according to the analytics aggregation information, to obtain an aggregated analytics result of the first network analytics, the analytics aggregation information includes aggregation indication information of one or more first network function sub-entities, and the one or more first network function sub-entities are configured to provide one or more first analytics results to the source network function entity. The source network function entity sends the analytics transfer request to the target network function entity, so that the target network function entity performs network analytics aggregation according to the analytics aggregation information of the first network analytics obtained through the analytics transfer request, and the aggregated analytics result of the first network analytics can be obtained, the related analytics transfer time can be shortened, the related signaling is reduced, the system resources are saved, and the network data analytics service is ensured not to be interrupted.

Implementation processes of the network analytics transfer method in the embodiments of the present disclosure are described in details from perspective of interaction among devices by way three examples.

Example 1: the source network function entity (NWDAF2) directly provides the analytics aggregation information to the target network function entity (NWDAF1), see FIG. 3 for details.

A1: The NWDAF2 requests subscription analytics information from the NWDAF3 and the NWDAF4, and aggregates the analytics information from the NWDAF3 and the NWDAF4 and then sends the aggregated analytics information to the Consumer NF.

Here, after the NWDAF2 receives the network analytics subscription request of the Consumer NF, the NWDAF2 requests the subscription analytics information from the NWDAF3 and the NWDAF4.

Specifically, the network analytics subscription request herein may employ an Analytics Information Subscription (Nnwdaf_AnalyticsSubscription_Subscribe) request, wherein the request carries information about the network analytics to be provided includes:
  (i) one or more Analytics Identities (Analytics ID) configured for identifying a requested type of network analytics, such as Analytics ID="Service Experience Analytics", Analytics ID="UE Mobility Analytics (UE Mobility)", etc.
  (ii) Analytics Filter Information, e.g., a region identifier, a slice identifier, etc.
  (iii) Target of Reporting, i.e., analyzing the UE or UE group identifier or any UE.

A2: NWDAF2 decides to perform analytics transfer.

Here, the NWDAF2 decides to transfer the ongoing network analytics to other NWDAF due to certain reasons (e.g., the NWDAF2 is overloaded, a fault occurs, the analyzed target UE moves out of the NWDAF service area, etc.).

A3: NWDAF2 queries an NRF or a local configuration, and determines a target NWDAF, that is, NWDAF1, to which the analytics is to be transferred.

It should be noted that, the target NWDAF may be a Distributed NWDAF (for example, the NWDAF3) that is being used by the NWDAF2, and if the NWDAF3 can meet the condition of the Target NWDAF (for example, the service area is the same as that of the NWDAF1), then in the subsequent step A4, the NWDAF2 does not need to provide information related to the NWDAF3 to the target NWDAF (NWDAF3), including the information of the NWDAF3 in the analytics aggregation information, the data of the NWDAF3, the analytics information, etc. which are locally obtained by the NWDAF3.

Here, the Target NWDAF in this example is NWDAF1, so the NWDAF2 in the subsequent step A4 still needs to provide, to the NWDAF1, information related to the Distributed NWDAF being used by the NWDAF2.

A4: NWDAF2 sends an analytics transfer request to NWDAF1.

Here, the NWDAF1 obtains, based on the analytics transfer request and from the NWDAF2, the context of the first network analytics being subjected to network analytics.

The context of the first network analytics includes analytics aggregation information.

Here, the analytics aggregation information includes aggregation indication information of Distributed NWDAFs (referred to herein as NWDAF3 and NWDAF4) for one or more Analytics IDs to be transferred.

Specifically, the aggregation indication information includes an ID or an address of the Distributed NWDAFs (for example, an FQDN and/or an Internet Protocol Address (IP Address). In another implementation of the present disclosure, the aggregation indication information further includes aggregation metadata of the Distributed NWDAF.

Here, the aggregation metadata of the Distributed NWDAF is the aggregation metadata which represents the data and/or characteristics of the analytics information for aggregation provided by the Distributed NWDAF, such as sampling time, frequency, region/location, format, precision, sampling rate, etc.

In another implementation of the present disclosure, the analytics aggregation information further includes aggregation metadata of the NWDAF2. For example, a manner of aggregating data and/or analytics information (aggregated in respect of an area/location, time, slice, UE, or a NF subset), a format, a precision, a sampling rate, etc.

Here, the context of the first network analytics further includes at least one of the following:
  1) one or more Analytics IDs;
  2) for one or more Analytics IDs, information of one or more network function (NF) entities providing data for the NWDAF2 and/or the Distributed NWDAF (e.g., identifier or address, requirements for data acquisition (e.g., time, a period));
  3) for one or more Analytics IDs, data collected by NWDAF2 and/or Distributed NWDAF. Specifically, the data may be the data content or the data address collected by the NWDAF2, and the data address may be represented in the form of, for example, a URL or an FQDN;
  4) for one or more Analytics IDs, analytics information output by the NWDAF2 and/or the Distributed NWDAF. Specifically, the analytics information may be the analytics information content or the analytics information address output by the NWDAF2; the analytics information address is represented in the form of, for example, a URL or an FQDN; the analytics information may include the analytics information (pending analytics information) that is output by the NWDAF2 (most recently) and has not been sent to the Consumer NF.

Specifically, step A4 May be implemented in the following two manners:

Manner 1: the NWDAF2 sends an analytics transfer request to the NWDAF1, and specifically, the Nnwdaf_AnalyticsSubscription_Subscribe request may be used. The request includes: an analytics transfer indication, information about the network analytics subscription of the NWDAF1 to be transferred to, the analytics context identifier, and the like. NWDAF1 sends a Nnwdaf_AnalytisSubscription_Subscribe reply to NWDAF2, acceptance of the analytics transfer is confirmed.

Here, the analytics context identifier is configured for identifying the context of the first network analytics to be transferred.

The NWDAF1 obtains, from the NWDAF2 according to the analytics context identifier, the context of the first network analytics that needs to be transferred and the context of the first network analytics includes the analytics aggregation information.

Manner 2: the NWDAF2 sends the analytics transfer request to the NWDAF1, and specifically, the NWDAF2 may adopt an Nnwdaf_AnalyticsSubscription_Subscribe request. The request includes: an analytics transfer indication, information about the network analytics subscription of the NWDAF1 to be transferred to, the context of the first network analytics. The context of the first network analytics includes the analytics aggregation information.

A5: NWDAF1 sends an analytics subscription request to NWDAF3;

Here, the analytics subscription request may employ an Nnwdaf_AnalyticsSubscription_Subscribe request.

It should be noted that the NWDAF1 determines whether to continue to use the Distributed NWDAFs (i.e., NWDAF3 and NWDAF4) to perform the transferred network analytics, according to the analytics aggregation information and the local policy.

Specifically, the NWDAF1 may determine whether to continue to use the original Distributed NWDAF according to whether aggregation metadata of the Distributed NWDAF satisfies analytics aggregation requirements (such as sampling time, precision, etc.) itself and whether a local policy (such as security requirements) is met.

Here, the Nnwdaf_AnalyticsSubscription_subscribe request includes one or more parameters indicating that the analytics information corresponding to the one or more Analytics IDs subscribed by the NWDAF2 is transferred to the NWDAF1.

In another implementation of the present disclosure, the Nnwdaf_AnalyticsSubscription_Subscribe request further includes aggregation metadata of the NWDAF1. For example, the updated manner of aggregating data and/or analytics information (aggregated according to the area/location, time, the slice, the UE, or the NF subset), the format, the precision, the sampling rate, etc.

If the NWDAF1 determines the requirement of aggregating data and/or analytics information is different from that of the NWDAF2 according to a local policy, the parameter is carried, so that the NWDAF3 provides data and/or analytics information according to new data and/or analytics information aggregation requirements.

A6: the NWDAF3 sends an analytics information notification to the NWDAF1.

In particular, the analytics information notification may employ an analytics subscription notification (Nnwdaf_AnalytisSubscription_Notify) service.

Here, the NWDAF3 sends Nnwdaf_AnalytisSubscription_Notify to NWDAF1 to confirm acceptance of the analytics information subscription request, where Nnwdaf_AnalytisSubscription_Notify may include updated aggregation metadata of the Distributed NWDAF (i.e., NWDAF3), e.g., a sampling time, a frequency, area/location, data format, a precision, a sampling rate, etc. The NWDAF3 may update the data and/or the characteristic of analytics information (i.e., aggregation metadata) used for aggregation provided by itself, according to the update aggregation metadata of the NWDAF1 and/or the local policy (such as a security requirement). NWDAF3 starts to provide analytics information for NWDAF1.

It should be noted that, if the aggregation metadata of the NWDAF3 is not updated, the Nnwdaf_AnalyticsSubscription_Notify may not carry the aggregation metadata of the NWDAF3. The NWDAF1 may perform aggregation processing on the analytics information output by the NWDAF3 by using the aggregation metadata of the NWDAF3 obtained in step A4.

A7: The NWDAF1 sends an analytics subscription request to the NWDAF5.

Here, the analytics subscription request may employ an Nnwdaf_AnalyticsSubscription_Subscribe request.

It should be noted that when the NWDAF1 determines, according to the analytics aggregation information and/or the local policy, that the NWDAF4 cannot provide analytics information for the NWDAF1, the NWDAF1 selects a new Distributed NWDAF, i.e., NWDAF5, by querying the NRF entity, to provide the analytics information.

For example, the NWDAF1 determines that the NWDAF4 has no service cooperation relationship with the NWDAF1, or the NWDAF4 does not meet the security requirement, or the aggregation metadata of the NWDAF4 does not meet the requirements of the NWDAF1 for aggregation of data and/or analytics information, etc. then the NWDAF5 is selected to replace the NWDAF4 to provide the analytics information.

Here, the Nnwdaf_AnalyticsSubscription_Subscribe request includes part or all of the information of the context of the first network analytics.

For example, for the one or more Analytics IDs, the NWDAF2 and/or the Distributed NWDAFs (NWDAF3, NWDAF4) collects data and/or output analytics information. The context of the first network analytics may assist NWDAF5 in performing network analytics, such as training and optimizing models, improving real-time performance and accuracy of analytics, etc.

In another implementation of the present disclosure, the Nnwdaf_AnalyticsSubscription_Subscribe request further includes: information related to the analytics information subscribed to the NWDAF5, including an Analytics ID, a Target of reporting, Analytics Filter Information, etc. and the information may be obtained according to information related to the network analytics subscription transferred to the NWDAF1 by the NWDAF2 of step A4.

In another implementation of the present disclosure, the Nnwdaf_AnalyticsSubscription_Subscribe request further includes aggregation metadata of the NWDAF1, for example, the updated manner of aggregating the data and/or analytics information (aggregated according to the area/location, time, slice, UE, or NF subset), format, precision, sampling rate, etc. If the NWDAF1 determines, according to the local policy, that the requirement of aggregating data and/or analytics information is different from that of the NWDAF2, the parameter may be carried, so that the NWDAF5 is request to provide data and/or analytics information according to new requirement of aggregating data and/or analytics information.

A8: NWDAF5 sends an analytics information notification to NWDAF1;

In particular, the analytics information notification may employ Nnwdaf_AnalyticsSubscription_Notify service.

Here, the NWDAF5 sends Nnwdaf_AnalyticsSubscription_Notify to the NWDAF1 to confirm that an analytics information subscription request is accepted, and the NWDAF5 starts to provide analytics information to the NWDAF1.

A9: NWDAF1 sends an analytics un-subscription request to NWDAF4.

NWDAF1 sends an analytics un-subscription request to NWDAF4 (Nnwdaf_AnalyticsSubscription_Unsubscribe) request.

Specifically, the analytics un-subscription request includes a Notification Target Address of the NWDAF1 and a Notification Correlation ID, so that the NWDAF4 no longer provides analytics information to the NWDAF2.

A10: NWDAF1 aggregates analytics information from NWDAF3 and NWDAF5;

A11: NWDAF1 provides network analytics information to a Consumer NF.

It should be noted that, before step A10 and step A11, the NWDAF1 may perform analytics information aggregation by using the analytics information output most recently by the NWDAF2, the NWDAF3 and the NWDAF4 in the step A4 and having not been sent to the Consumer NF and the aggregation metadata of the NWDAF2, the NWDAF3, and the NWDAF4, and provide the aggregated analytics information to the Consumer NF.

Figure 4:
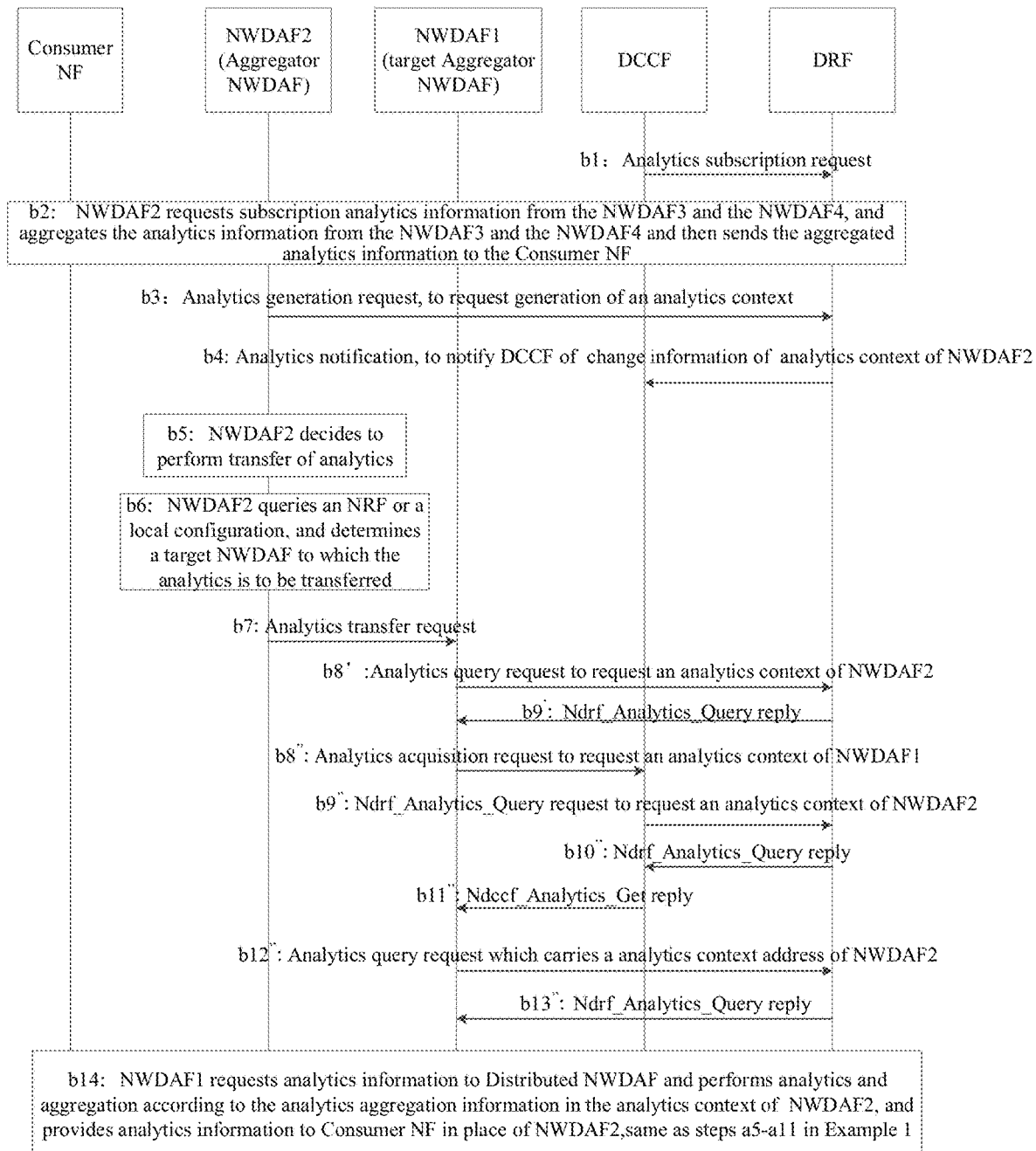
FIG. 4 is a fourth schematic flowchart of a network analytics transfer method according to some embodiments of the present disclosure.

Example 2: the NWDAF2 stores the analytics aggregation information to the DRF, so that the NWDAF1 requests the analytics aggregation information from the DRF/DCCF during the analytics transfer. See FIG. 4 for details B1: the Data Collection Coordination Function (DCCF) initiates an analytics subscription request to a Data Repository Function (DRF).

Here, the DCCF initiates an analytics subscription request (Ndrf_Analysics_Subscibe) to the DRF, subscribes analytics context change information to the DRF. Specifically, the analytics subscription request may include one or more Analytics IDs, an Area of Interest, slice information, one or more NWDAF identifiers (and/or addresses), etc., to indicate change information of an analytics context about which Analytics IDs, regions, slices, and/or NWDAF are desired to be subscribed by the DCCF.

B2: the NWDAF2 requests subscription analytics information from the NWDAF3 and the NWDAF4, and aggregates the analytics information from the NWDAF3 and the NWDAF4 and then sends the aggregated analytics information to the Consumer NF.

B3: NWDAF2 initiates an analytics generation request to the DRF, to request generation of an analytics context.

Here, the analytics generation request (Ndrf_Analytics_Create) includes the analytics context of the NWDAF2, i.e., the context of the first network analytics that is being subject to the network analytics.

The information included in the context of the first network analytics may specifically be obtained by referring to the description of the step A4 in the Example 1, and details are not described herein again. In particular, the context of the first network analytics includes analytics aggregation information.

After that, the DRF sends an Ndrf_Analytics_Create reply to the NWDAF2, wherein in another implementation of the present disclosure, the Ndrf_Analytics_Create reply includes an analytics context address of the NWDAF2, which may also be provided in respect of the Analytics ID. That is, {NWDAF2 analytics context address}, or {Analytics ID1, an analytics context address of NWDAF2 corresponding to Analytics ID1; Analytics ID2, an analytics context address of NWDAF1 corresponding to Analytics ID2; . . . }.

B4: the DRF initiates an analytics notification to the DCCF, and notifies the DCCF of the change information of the analytics context of the NWDAF2.

Here, the analytics notification (Ndrf_Analytics_Notify) includes an NWDAF2 identifier (and/or address), an address of the analytics context of the NWDAF2 (e.g., a URL, an FQDN, or a storage identifier or index in the DCCF), wherein the analytics context address of the NWDAF2 may also be provided in respect of the Analytics ID. For example, {NWDAF1 ID, a NWDAF1 analytics context address}, or {NWDAF1 ID, Analytics ID 1, NWDAF1 analytics context address corresponding to Analytics ID 1; Analytics ID 2, NWDAF1 analytics context address corresponding to the Analytics ID 2; . . . }.

B5-B6 are the same as steps A2 and A3 in Example 1, and details are not described herein again.

B7: the NWDAF2 sends an analytics transfer request to the NWDAF1.

Here, the analytics transfer request is the first request in the embodiments of the present disclosure. Specifically, the analytics transfer request may adopt an Nnwdaf_AnalyticsSubscription_Subscribe request, which includes: the analytics transfer indication and one or more Analytics IDs, which are used to indicate analytics corresponding to which Analytics IDs is transferred to analytics context addresses of NWDAF1 and NWDAF2.

Here, when the NWDAF2 transfers the analytics corresponding to all the Analytics IDs to the NWDAF1, the analytics transfer request may not include the parameter.

It should be noted that, if the NWDAF2 learns the analytics context address of the NWDAF2 from the DRF (corresponding to the case in which the first request includes the first identifier in the embodiments of the present disclosure) (see step B3), the analytics context address of the NWDAF2 may be included in the analytics transfer request.

Subsequently, NWDAF1 queries the analytics context of the NWDAF2 to the DRF or queries the analytics context of the NWDAF2 to the DRF via the DCCF, and may take the following manner 1 (steps B8'-B9') or manner 2 (steps B8"-B13").

Manner 1: NWDAF1 queries the analytics context of NWDAF2 to DRF.

B8': NWDAF1 initiates an analytics query request to the DRF to request an analytics context of the NWDAF2.

Specifically, the Analytics Query (NDRF_Analytics_Query) request includes NWDAF2 identification (and/or address). In another implementation of the present disclosure, the analytics query request further includes: one or more Analytics ID, an analytics context address of the NWDAF2.

B9': The DRF sends the Ndrf_Analytics_Query reply to the NWDAF1.

The Ndrf_Analytics_Query reply includes the NWDAF2 analytics context, and in particular, the NWDAF2 analytics context includes the analytics aggregation information.

If the Ndrf_Analytics_Query includes one or more analytics IDs, the DRF may only provide an analytics context of the NWDAF2 corresponding to the one or more Analytics IDs.

If the Ndrf_Analytics_Query contains the analytics context address of the NWDAF2, the DRF returns the analytics context of the NWDAF2 according to the address.

Manner 2: NWDAF1 queries the analytics context of NWDAF2 to DRF via DCCF.

B8": The NWDAF1 initiates an analytics acquisition request to the DCCF, to request an analytics context of the NWDAF1.

Here, the analytics acquisition (Ndccf_Analytics_Get) request includes an NWDAF2 identifier (and/or address). In another implementation of the present disclosure, the analytics acquisition request further includes one or more Analytics IDs; or, if the analytics transfer request in step B7 includes the analytics context address of the NWDAF2, the Ndccf_Analytics_Get request includes the analytics context address of the NWDAF2.

B9": the DCCF initiates an Ndrf_Analytics_Query request to the DRF, to request an analytics context of the NWDAF2.

Specifically, the Ndrf_Analytics_Query request includes an NWDAF2 identifier (and/or address); if the Ndccf_Analytics_Get request includes one or more Analytics IDs; in another implementation of the present disclosure, the Ndrf_Analytics_Query request further includes one or more Analytics IDs; or, if the Ndccf_Analytics_Get request includes the analytics context address of the NWDAF2, in another implementation of the present disclosure, the Ndrf_Analytics_Query request further includes an analytics context address of the NWDAF2.

B10": The DRF sends the Ndrf_Analytics_Query reply to the DCCF.

The Ndrf_Analytics_Query reply includes an NWDAF2 analytics context, or an analytics context address of the NWDAF2.

In particular, the NWDAF2 analytics context includes analytics aggregation information.

If the Ndrf_Analytics_Query includes one or more Analytics IDs, the DRF may provide an analytics context of the NWDAF2 corresponding to the one or more Analytics IDs, or provide an analytics context address of the NWDAF2 corresponding to the one or more Analytics IDs; or if the Ndrf_Analytics_Query request includes an analytics context address of the NWDAF2, the Ndrf_Analytics_Query reply includes an analytics context of the NWDAF2.

B11": DCCF sends the Ndccf_Analytics_Get reply to the NWDAF1.

The Ndccf_Analytics_Get reply includes an NWDAF2 analytics context, or an analytics context address of the NWDAF2.

Here, the Ndccf_Analytics_Get reply is the same as the information in the Ndrf_Analytics_Query reply in step B10".

B12": The NWDAF1 initiates an analytics query request to the DRF, the request carries the analytics context address of the NWDAF2.

In the case that the Ndccf_Analytics_Get reply includes the analytics context address of the NWDAF2, the foregoing step B12" is performed.

Here, the Ndrf_Analytics_Query request is the analytics query request.

B13": The DRF sends an Ndrf_Analytics_Query reply to the NWDAF1.

Here, the Ndrf_Analytics_Query reply includes the analytics context of the NWDAF2 returned by the DRF based on the analytics context address of the NWDAF2, i.e., the context of the first network analytics.

In particular, the context of the first network analytics includes analytics aggregation information.

B14: The NWDAF1 requests the analytics information to Distributed NWDAF and performs analytics aggregation according to the analytics aggregation information in the analytics context of the NWDAF2, and provides analytics information to the Consumer NF in place of NWDAF2.

Here is same as the step A5-step A11 in the example 1.

Figure 5:
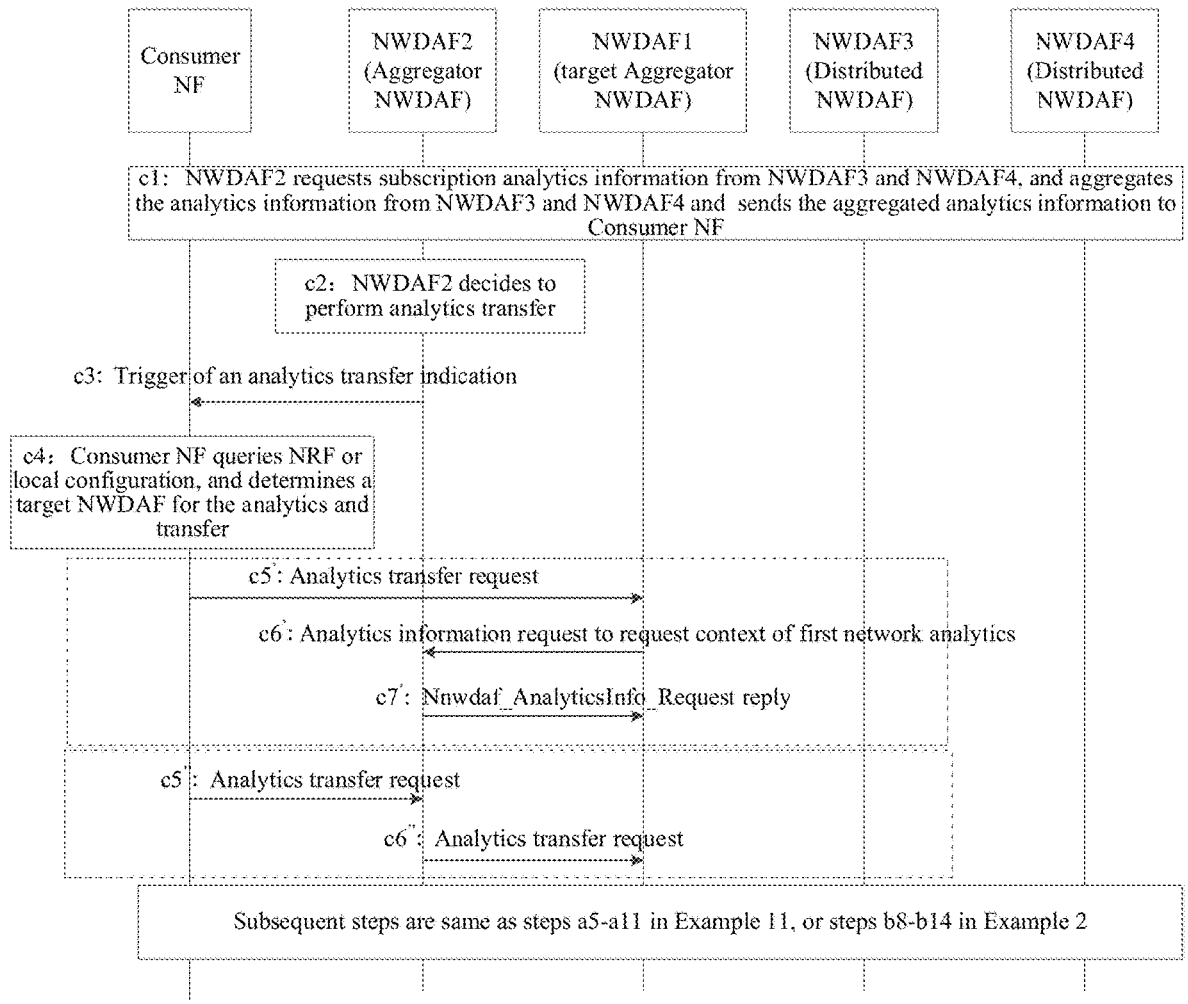
FIG. 5 is a fifth schematic flowchart of a network analytics transfer method according to some embodiments of the present disclosure.

Example 3: The Consumer NF triggers initiation of execution of network analytics transfer, that is, corresponding to the case in which the analytics transfer request is received from the user network function entity in the embodiments of the present disclosure, see FIG. 5 for details.

C1: The NWDAF2 requests subscription analytics information from the NWDAF3 and the NWDAF4, and aggregates the analytics information from the NWDAF3 and the NWDAF4 and then sends the aggregated analytics information to the Consumer NF.

C2: NWDAF2 decides to perform analytics transfer.

C3: NWDAF2 initiates trigger of an analytics transfer indication to the Consumer NF.

Specifically, for example, the analytics transfer indication may employ Nnwdaf_AnalyticsSubscription_Notify. The analytics transfer indication includes an indication of "unable to provide analytics information". In another implementation of the present disclosure, the analytics transfer indication further includes one or more Analytics IDs indicating that analytics information corresponding to the one or more Analytics IDs cannot be provided.

C4: The Consumer NF queries the NRF or the local configuration, and determines the target NWDAF for analytics transfer, that is, NWDAF1.

Here, the Consumer NF decides to initiate the analytics transfer, and transfers the analytics in the NWDAF2 to another NWDAF, for example, due to the trigger of step C3, or based on a local policy (for example, network analytics load balancing, etc.), the NWDAF is reselected.

Subsequently, the Consumer NF initiates an analytics transfer request to the NWDAF1 or the NWDAF2, and the following manner 1 (step C5' to step C7') or the manner 2 (step C5" to step C6") may be used.

Manner 1: The Consumer NF initiates the analytics transfer request to the NWDAF1.

C5': The Consumer NF initiates the analytics transfer request to the NWDAF1.

Specifically, an Nnwdaf_AnalyticsSubscription_Subscribe request, i.e., the analytics transfer request, may be used. The analytics transfer request includes an analytics transfer instruction, an NWDAF2 identifier, a Notification Target Address of the NWDAF2, and a Notification Correlation ID.

In another implementation of the present disclosure, the analytics transfer request further includes one or more Analytics IDs indicating that analytics corresponding to the one or more Analytics IDs is requested to be transferred to the NWDAF1

C6': The NWDAF1 initiates an analytics information request to the NWDAF2, to request the context of the first network analytics.

Specifically, an analytics information request (Nnwdaf_AnalyticsInfo_Request) may be used. The analytics information request includes an analytics context request indication, a Notification Target Address of the NWDAF2 and/or a Notification Correlation ID.

In another implementation of the present disclosure, the analytics information request further includes one or more Analytics IDs indicating that an analytics context corresponding to the one or more Analytics IDs is requested.

C7': The NWDAF2 sends an Nnwdaf_AnalyticsInfo_Request reply to NWDAF1.

The information carried in the Nnwdaf_AnalyticsInfo_Request reply is the same as the information carried in the analytics transfer request in step A4 in Example 1 or step B7 of Example 1. Details are not described herein again.

Manner 2: The Consumer NF sends an analytics transfer request to the NWDAF2.

C5": The Consumer NF initiates an analytics transfer request to the NWDAF2.

Specifically, an Nnwdaf_Analytics Transfer_Request request, i.e. the analytics transfer request, may be used. The analytics transfer request includes an analytics transfer indication and an identifier of the NWDAF1. In another implementation of the present disclosure, the analytics transfer request further includes one or more Analytics IDs indicating that analytics corresponding to the one or more Analytics IDs is requested to be transferred to the NWDAF1.

C6": The NWDAF2 sends an analytics transfer request to the NWDAF1.

Here, this step is the same as step A4 in Example 1 or step B7 of Example 2.

Subsequent steps are same as steps A5-A11 in the Example 1 or steps B8-step B14 in the Example 2, and are not described herein again.

Figure 6:
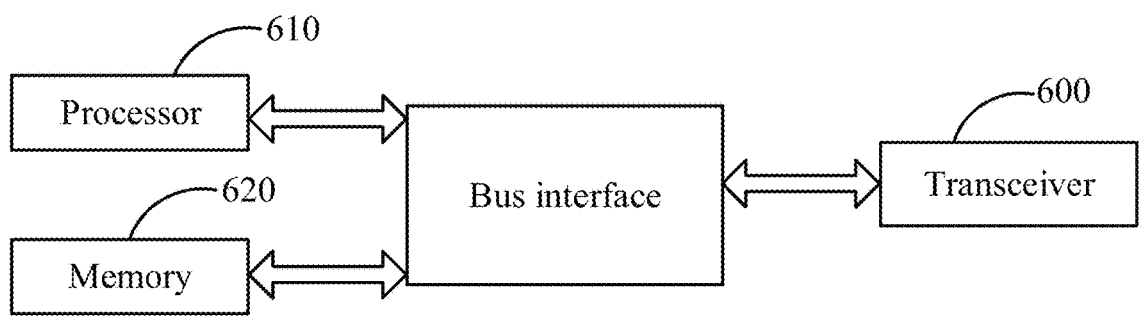
FIG. 6 is a structural block diagram of a target network function entity according to some embodiments of the present disclosure.

As shown in FIG. 6, an embodiment of the present disclosure further provides a target network function entity which includes: a memory 620, a transceiver 600, and a processor 610. The memory 620 is configured to store a computer program; the transceiver 600 is configured to send and receive data under the control of the processor 610; and the processor 610 is configured to read the computer program in the memory 620 and perform the following operations:

- receiving an analytics transfer request via the transceiver, wherein the analytics transfer request is configured to request to transfer first network analytics from a source network function entity to the target network function entity;
- obtaining analytics aggregation information of the first network analytics according to the analytics transfer request, wherein the analytics aggregation information includes aggregation indication information of one or more first network function sub-entities, and the one or more first network function sub-entities are configured to provide one or more first analytics results to the source network function entity;
- performing network analytics aggregation according to the analytics aggregation information, to obtain an aggregated analytics result of the first network analytics.

In FIG. 6, the bus architecture may include any number of interconnected buses and bridges. Specifically, various circuits such as one or more processors represented by the processor 610 and a memory represented by the memory 620 are linked together. The bus architecture may also link together various other circuits, such as peripheral devices, voltage regulators, and power management circuits, etc., which are well known in the art, and therefore are not further described herein. The bus interface provides an interface. The transceiver 600 may be a plurality of elements, i.e., include a transmitter and a receiver, and provide a unit for communicating with various other devices over a transmission medium. The transmission medium includes a wired channel, a wireless channel, a fiber cable, and the like. The processor 610 is responsible for managing a bus architecture and general processing, and the memory 620 may store data used by the processor 610 when performing an operation.

The processor 610 may be a Central Processing Unit (CPU), an Application-Specific Integrated Circuit (ASIC), a Field-Programmable Gate Array (FPGA), or a Complex Programmable Logic Device (CPLD), and the processor may also adopt a multi-core architecture.

In another implementation of the present disclosure, the aggregation indication information includes one or more identifiers of the one or more first network function sub-entities or one or more addresses of the one or more first network function sub-entities.

In another implementation of the present disclosure, the analytics aggregation information is included in the context of the first network analytics.

In another implementation of the present disclosure, the processor 610 is configured to read program instructions in the memory and perform the following operations:

- obtaining the analytics aggregation information from the source network function entity according to the analytics transfer request; or
- according to the analytics transfer request, obtaining the analytics aggregation information from a Data Repository Function (DRF) entity or a Data Collection Coordination Function (DCCF) entity.

In another implementation of the present disclosure, the processor 610 is configured to read program instructions in the memory and perform the following operations:

- obtaining, according to the analytics aggregation information, a first analytics result provided by the one or more first sub-network functional entities and related to the first network analytics; and
- performing an aggregation operation according to the first analytics result to obtain an aggregated analytics result.

In another implementation of the present disclosure, the processor 610 is configured to read program instructions in the memory and perform the following operations:

- obtaining, according to the analytics aggregation information and/or a local policy, a second analytics result provided by a second sub-network function entity and related to the first network analytics;
- aggregating the first analytics result and the second analytics result to obtain the aggregated analytics result.

In another implementation of the present disclosure, the aggregation indication information further includes analytics aggregation description information of the first network function sub-entity. The processor 610 is configured to read program instructions in the memory and perform the following operations:

- obtaining the first analytics result related to the first network analytics and provided by the first network function sub-entity, in a case that the analytics aggregation description information of the one or more first network function sub-entities meets network analytics aggregation requirement of the target network function entity.

In another implementation of the present disclosure, the processor 610 is configured to read program instructions in the memory and perform the following operations:

- sending, according to the analytics aggregation information, analytics aggregation description information of the target network function entity to the one or more first network function sub-entities; and
- obtaining one or more first analytics results related to the first network analytics and provided by the one or more first network function sub-entities based on the analytics aggregation description information of the target network function entity to the target network function entity.

In the target network function entity in the embodiments of the present disclosure, the target network function entity receives the analytics transfer request, and the analytics transfer request is configured to request to transfer the first network analytics from the source network function entity to the target network function entity. analytics aggregation information of the first network analytics is obtained according to the analytics transfer request, wherein the analytics aggregation information includes aggregation indication information of one or more network function sub-entities, and the one or more network function sub-entities are network function sub-entities that provide a first analytics result to the source network function entity; and network analytics aggregation is executed according to the analytics aggregation information to obtain an aggregated analytics result of the first network analytics, so that the target network function entity performs network analytics aggregation according to the obtained analytics aggregation information of the first network analytics. In this target network function entity, the aggregated analytics result of the first network analytics can be obtained, so that the related analytics transfer time can be shortened, the related signaling is reduced, the system resources are saved, and the network data analytics service is ensured not to be interrupted.

It should be noted that the above-mentioned apparatus provided in the embodiments of the present disclosure can implement all method steps implemented by the foregoing method embodiments, and can achieve the same technical effect, and the same parts and beneficial effects of the method embodiments in this embodiment are not described in detail herein.

Figure 7:
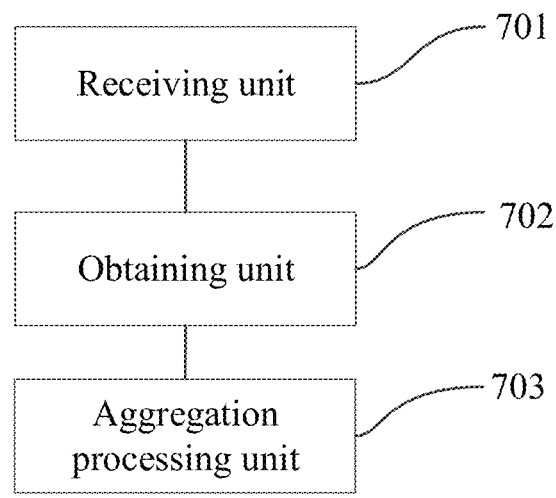
FIG. 7 is a first schematic block diagram of a network analytics transfer apparatus according to some embodiments of the present disclosure.

As shown in FIG. 7, an embodiment of the present disclosure further provides a network analytics transfer apparatus. The apparatus includes a receiving unit 701, configured to receive an analytics transfer request, wherein the analytics transfer request is configured to request to transfer first network analytics from a source network function entity to the target network function entity;

an obtaining unit 702, configured to obtain analytics aggregation information of the first network analytics according to the analytics transfer request, wherein the analytics aggregation information includes aggregation indication information of one or more first network function sub-entities, and the one or more first network function sub-entities are configured to provide one or more first analytics results to the source network function entity;

an aggregation processing unit 703, configured to perform network analytics aggregation according to the analytics aggregation information, to obtain an aggregated analytics result of the first network analytics.

In another implementation of the present disclosure, the aggregation indication information includes one or more identifiers of the one or more first network function sub-entities or one or more addresses of the one or more first network function sub-entities.

In another implementation of the present disclosure, the analytics aggregation information is included in the context of the first network analytics.

In another implementation of the present disclosure, the obtaining unit 702 is specifically configured to:

obtain the analytics aggregation information from the source network function entity according to the analytics transfer request; or according to the analytics transfer request, obtain the analytics aggregation information from a Data Repository Function (DRF) entity or a Data Collection Coordination Function (DCCF) entity.

In another implementation of the present disclosure, the aggregation processing unit 703 is specifically configured to:

obtain, according to the analytics aggregation information, a first analytics result provided by the one or more first sub-network functional entities and related to the first network analytics; and perform an aggregation operation according to the first analytics result to obtain an aggregated analytics result.

In another implementation of the present disclosure, the aggregation processing unit 703 is further specifically configured to:

before performing the aggregation operation according to the first analytics result to obtain the aggregated analytics result, obtain, according to the analytics aggregation information and/or a local policy, a second analytics result provided by a second sub-network function entity and related to the first network analytics;

aggregate the first analytics result and the second analytics result to obtain the aggregated analytics result.

In another embodiment of the present disclosure, the aggregation indication information further includes analytics aggregation description information of the first network function sub-entity. The aggregation processing unit 703 is further specifically configured to:

obtain the first analytics result related to the first network analytics and provided by the first network function sub-entity, in a case that the analytics aggregation description information of the one or more first network function sub-entities meets network analytics aggregation requirement of the target network function entity.

In another implementation of the present disclosure, the aggregation processing unit 703 is further specifically configured to:

send, according to the analytics aggregation information, analytics aggregation description information of the target network function entity to the one or more first network function sub-entities; and obtain one or more first analytics results related to the first network analytics and provided by the one or more first network function sub-entities based on the analytics aggregation description information of the target network function entity to the target network function entity.

In the network analytics transfer apparatus in the embodiments of the present disclosure, the network analytics transfer apparatus receives the analytics transfer request, and the analytics transfer request is configured to request to transfer the first network analytics from the source network function entity to the target network function entity. analytics aggregation information of the first network analytics is obtained according to the analytics transfer request, wherein the analytics aggregation information includes aggregation indication information of one or more network function sub-entities, and the one or more network function sub-entities are network function sub-entities that provide a first analytics result to the source network function entity; and network analytics aggregation is executed according to the analytics aggregation information to obtain an aggregated analytics result of the first network analytics, so that the network analytics transfer apparatus performs network analytics aggregation according to the obtained analytics aggregation information of the first network analytics. In this network analytics transfer apparatus, the aggregated analytics result of the first network analytics can be obtained, so that the related analytics transfer time can be shortened, the related signaling is reduced, the system resources are saved, and the network data analytics service is ensured not to be interrupted.

It should be noted that, division of units in the embodiments of the present disclosure is schematic, but is merely a logical function division, and there may be another division manner in actual implementation. In addition, functional units in the embodiments of the present disclosure may be integrated into one processing unit, or each of the units may exist alone physically, or two or more units may be integrated into one unit. The integrated unit may be implemented in the form of hardware, or may be implemented in the form of a software functional unit.

When the integrated unit is implemented in the form of a software functional unit and sold or used as an independent product, the integrated unit may be stored in a processor-readable storage medium. Based on such understanding, an essential part, or a part contributing to the related to, or some or all, of the technical solutions of the present disclosure may be embodied in the form of a software product, and the computer software product is stored in a storage medium, and includes several instructions for enabling a computer device (which may be a personal computer, a server, or a network device, etc.) or a processor to perform all or part of the steps of the method according to various embodiments of the present disclosure. The foregoing storage medium includes various media that can store program codes, such as a USB flash disk, a mobile hard disk, a Read-Only Memory (ROM), a Random Access Memory (RAM), a magnetic disk, or an optical disk.

It should be noted that the above-mentioned apparatus provided in the embodiments of the present disclosure can implement all method steps implemented by the foregoing method embodiments, and can achieve the same technical effect, and the same parts between the method embodiment and this embodiment and beneficial effects of the method embodiments and this embodiment are not described in detail herein again.

In some embodiments of the present disclosure, a processor-readable storage medium is further provided, the processor-readable storage medium stores program instructions, and the program instructions are configured to cause the processor to perform the following steps:

receiving an analytics transfer request, wherein the analytics transfer request is configured to request to transfer first network analytics from a source network function entity to the target network function entity;

obtaining analytics aggregation information of the first network analytics according to the analytics transfer request, wherein the analytics aggregation information includes aggregation indication information of one or more first network function sub-entities, and the one or more first network function sub-entities are configured to provide one or more first analytics results to the source network function entity;

performing network analytics aggregation according to the analytics aggregation information, to obtain an aggregated analytics result of the first network analytics.

When the program is executed by the processor, all implementations of the foregoing method embodiments applied to the target network function entity side shown in FIG. 1 may be implemented, and in order to avoid repetition, details are not described herein again.

Figure 8:
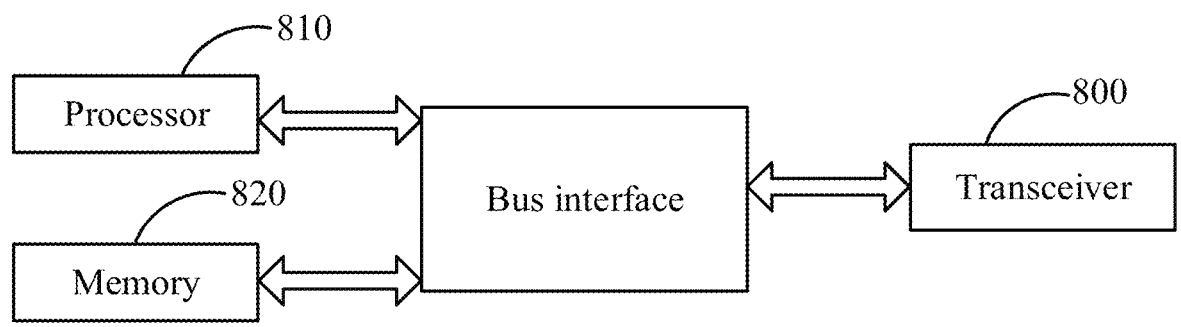
FIG. 8 is a structural block diagram of a source network function entity according to some embodiments of the present disclosure.

As shown in FIG. 8, an embodiment of the present disclosure further provides a source network function entity which includes: a memory 820, a transceiver 800, and a processor 810. The memory 820 is configured to store a computer program; the transceiver 800 is configured to send and receive data under the control of the processor 810; and the processor 810 is configured to read the computer program in the memory 820 and perform the following operations:

sending an analytics transfer request to a target network function entity through the transceiver, wherein the analytics transfer request is configured to request to transfer first network analytics from the source network function entity to a target network function entity, so that the target network function entity obtains analytics aggregation information of the first network analytics according to the analytics transfer request, and performs network analytics aggregation according to the analytics aggregation information, to obtain an aggregated analytics result of the first network analytics, wherein the analytics aggregation information includes aggregation indication information of one or more first network function sub-entities, and the one or more first network function sub-entities are configured to provide one or more first analytics results to the source network function entity.

In FIG. 8, a bus architecture may include any number of interconnected buses and bridges. Specifically, various circuits such as one or more processors represented by the processor 810 and a memory represented by the memory 820 are linked together. The bus architecture may also link together various other circuits, such as peripheral devices, voltage regulators, and power management circuits, etc., which are well known in the art, and therefore are not further described herein. The bus interface provides an interface. The transceiver 800 may be a plurality of elements, i.e., include a transmitter and a receiver, and provide a unit for communicating with various other devices over a transmission medium. The transmission medium includes a wired channel, a wireless channel, a fiber cable, and the like. The processor 810 is responsible for managing a bus architecture and general processing, and the memory 820 may store data used by the processor 810 when performing an operation.

The processor 810 may be a Central Processing Unit (CPU), an Application-Specific Integrated Circuit (ASIC), a Field-Programmable Gate Array (FPGA), or a Complex Programmable Logic Device (CPLD), and the processor may also adopt a multi-core architecture.

In another implementation of the present disclosure, the analytics transfer request includes the analytics aggregation information, or the analytics transfer request includes a first identifier, so that the target network function entity requests the analytics aggregation information from a Data Repository Function (DRF) entity or a Data Collection Coordination Function (DCCF) entity according to the first identifier.

The source network function entity in the embodiments of the present disclosure sends the analytics transfer request to the target network function entity, wherein the analytics transfer request is configured to request to transfer the first network analytics from the source network function entity to the target network function entity, so that the target network function entity obtains analytics aggregation information of the first network analytics according to the analytics transfer request, and performs network analytics aggregation according to the analytics aggregation information, to obtain an aggregated analytics result of the first network analytics, the analytics aggregation information includes aggregation indication information of one or more first network function sub-entities, and the one or more first network function sub-entities are configured to provide one or more first analytics results to the source network function entity. In this way, the source network function entity sends the analytics transfer request to the target network function entity, so that the target network function entity performs network analytics aggregation according to the analytics aggregation information of the first network analytics obtained through the analytics transfer request, and the aggregated analytics result of the first network analytics can be obtained, the related analytics transfer time can be shortened, the related signaling is reduced, the system resources are saved, and the network data analytics service is ensured not to be interrupted.

It should be noted that the above-mentioned apparatus provided in the embodiments of the present disclosure can implement all steps of the method implemented by the foregoing method embodiments, and can achieve the same technical effect, and the same parts between the method claims and this embodiment and beneficial effects of the method embodiments and this embodiment are not described in detail herein.

Figure 9:
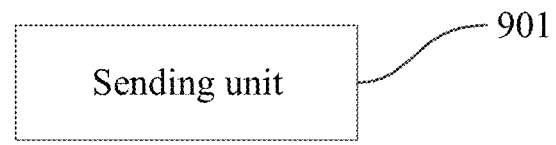
FIG. 9 is a second schematic block diagram of a network analytics transfer apparatus according to some embodiments of the present disclosure.

As shown in FIG. 9, an embodiment of the present disclosure further provides a network analytics transfer apparatus. The apparatus includes:

a sending unit 901, configured to send an analytics transfer request to a target network function entity, wherein the analytics transfer request is configured to request to transfer first network analytics from a source network function entity to a target network function entity, so that the target network function entity obtains analytics aggregation information of the first network analytics according to the analytics transfer request, and performs network analytics aggregation according to the analytics aggregation information, to obtain an aggregated analytics result of the first network analytics, wherein the analytics aggregation information includes aggregation indication information of one or more first network function sub-entities, and the one or more first network function sub-entities are configured to provide one or more first analytics results to the source network function entity.

In another implementation of the present disclosure, the analytics transfer request includes the analytics aggregation information, or the analytics transfer request includes a first identifier, so that the target network function entity requests the analytics aggregation information from a Data Repository Function (DRF) entity or a Data Collection Coordination Function (DCCF) entity according to the first identifier.

The network analytics transfer apparatus according to some embodiments of the present disclosure sends the analytics transfer request to the target network function entity, wherein the analytics transfer request is configured to request to transfer the first network analytics from the source network function entity to the target network function entity, so that the target network function entity obtains analytics aggregation information of the first network analytics according to the analytics transfer request, and performs network analytics aggregation according to the analytics aggregation information, to obtain an aggregated analytics result of the first network analytics, the analytics aggregation information includes aggregation indication information of one or more first network function sub-entities, and the one or more first network function sub-entities are configured to provide one or more first analytics results to the source network function entity. In this way, the source network function entity sends the analytics transfer request to the target network function entity, so that the target network function entity performs network analytics aggregation according to the analytics aggregation information of the first network analytics obtained through the analytics transfer request, and the aggregated analytics result of the first network analytics can be obtained, the related analytics transfer time can be shortened, the related signaling is reduced, the system resources are saved, and the network data analytics service is ensured not to be interrupted.

It should be noted that, division of units in the embodiments of the present disclosure is schematic, but is merely a logical function division, and there may be another division manner in actual implementation. In addition, functional units in the embodiments of the present disclosure may be integrated into one processing unit, or each of the units may exist alone physically, or two or more units may be integrated into one unit. The integrated unit may be implemented in the form of hardware, or may be implemented in the form of a software functional unit.

When the integrated unit is implemented in the form of a software functional unit and sold or used as an independent product, the integrated unit may be stored in a processor-readable storage medium. Based on such understanding, an essential part, or a part contributing to the related to, or some or all, of the technical solutions of the present disclosure may be embodied in the form of a software product, and the computer software product is stored in a storage medium, and includes several instructions for enabling a computer device (which may be a personal computer, a server, or a network device, etc.) or a processor to perform all or part of the steps of the method according to various embodiments of the present disclosure. The foregoing storage medium includes various media that can store program codes, such as a USB flash disk, a mobile hard disk, a Read-Only Memory (ROM), a Random Access Memory (RAM), a magnetic disk, or an optical disk.

It should be noted that the above-mentioned apparatus provided in the embodiments of the present disclosure can implement all method steps implemented by the foregoing method embodiments, and can achieve the same technical effect, and the same parts between the method embodiment and this embodiment and beneficial effects of the method embodiments and this embodiment are not described in detail herein again.

In some embodiments of the present disclosure, a processor-readable storage medium is further provided, the processor-readable storage medium stores program instructions, and the program instructions are configured to cause the processor to perform the following steps:

sending an analytics transfer request to a target network function entity, wherein the analytics transfer request is configured to request to transfer first network analytics from a source network function entity to a target network function entity, so that the target network function entity obtains analytics aggregation information of the first network analytics according to the analytics transfer request, and performs network analytics aggregation according to the analytics aggregation information, to obtain an aggregated analytics result of the first network analytics, wherein the analytics aggregation information includes aggregation indication information of one or more first network function sub-entities, and the one or more first network function sub-entities are configured to provide one or more first analytics results to the source network function entity.

When the program is executed by the processor, all implementations of the foregoing method embodiments applied to the source network function entity side shown in FIG. 2 may be implemented, and in order to avoid repetition, details are not described herein again.

The technical solutions provided in the embodiments of the present disclosure may be applied to various systems, especially 5G systems. For example, applicable systems may be a Global System Of Mobile Communication (GSM) system, a Code Division Multiple Access (CDMA) system, a Wideband Code Division Multiple Access (WCDMA) General Packet Radio Service (GPRS) system, a Long Term Evolution (LTE) system, a LTE Frequency Division Duplex (FDD) system, a LTE Time Division Duplex (TDD) system, a Long Term Evolution Advanced (LTE-A) system, a Universal Mobile Telecommunication System (UMTS) a Worldwide Interoperability for Microwave Access (WiMAX) system, a 5G New Radio (NR) system, and the like. Each system includes a terminal device and a network device. The system may further include a core network portion, such as an Evolved Packet System (EPS), a 5G system (5GS), etc.

Those skilled in the art should understand that the embodiments of the present disclosure may be provided as a method, a system, or a computer program product. Thus, the present disclosure may take the form of an entirely hardware embodiment, a full software embodiment, or embodiments incorporating software and hardware aspects. Moreover, the present disclosure may take the form of a computer program product implemented on one or more computer-usable storage media (including but not limited to a disk memory and an optical memory, etc.) including computer-usable program codes.

The present disclosure is described with reference to flowcharts of the methods and/or block diagrams of apparatus (systems), and computer program products according to embodiments of the present disclosure. It should be understood that each flow in the flowcharts and/or each block in the block diagrams, and combinations of flows in the flowcharts and/or blocks in the block diagrams, can be implemented by computer-executable instructions. These computer-executable instructions may be provided to a processor of a general purpose computer, a special purpose computer, an embedded processor, or other programmable data processing device, to generate a machine such that instructions executed by a processor of the computer or other programmable data processing device generate means for implementing functions specified in one or more flows of the flowcharts and/or one or more blocks of the block diagrams.

These processor-executable instructions may also be stored in a processor-readable memory that can direct a computer or other programmable data processing device to operate in a particular manner, such that the instructions stored in the processor-readable memory produce a product that includes an instruction device that implements the functions specified in one or more flows of the flowcharts and/or one or more blocks of the block diagrams.

These processor-executable instructions may also be loaded onto a computer or other programmable data processing device, such that a series of operational steps are performed on a computer or other programmable device to produce a computer-implemented process, such that the instructions executed on the computer or other programmable device provide steps for implementing the functions specified in one or more flows of the flowcharts and/or one or more blocks of the block diagrams.

It should be noted that, a division of the above modules is merely a division of logical functions, and all or some of the modules may be integrated onto one physical entity during actual implementation, or may be physically separated. In addition, these modules may all be implemented in the form of software invoked by a processing element, or may all be implemented in the form of hardware; or some modules may be implemented in the form of a processing element invoking software, and some of the modules are implemented in the form of hardware. For example, the determining module may be a separately configured processing element, or may be integrated in a certain chip of the foregoing apparatus, and in addition, the determining module may also be stored in a memory of the apparatus in the form of program codes, and a certain processing element of the apparatus invokes and executes the program codes to implement the functions of the determining module. Implementations of other modules are similar. In addition, all or part of these modules may be integrated together, or may be implemented independently. The processing element described herein may be an integrated circuit having a signal processing capability. In an implementation process, each step of the above-mentioned method or each of the above modules may be completed by means of an integrated logic circuit of hardware in the processor element or an instruction in a software form.

For example, each module, unit, subunit, or sub-module may be one or more integrated circuits configured to implement the above method, for example, one or more Application Specific Integrated Circuits (ASICs), or one or more microprocessors (digital signal processors, DSPs), or one or more Field Programmable Gate Arrays (FPGAs), etc. For another example, when a certain module is implemented in the form of a processing element invoking the program codes, the processing element may be a general-purpose processor, for example, a Central Processing Unit (CPU) or another processor that may invoke program codes. For another example, these modules may be integrated together and implemented in the form of a system-on-a-chip (SOC).

The terms "first", "second", and the like in the specification and claims of the present disclosure are used to distinguish similar objects, and do not need to be used to describe a specific order or sequence. It should be understood that the terms used in this way may be interchanged under appropriate circumstances so that the embodiments of the present disclosure described herein, for example, are implemented in an order other than those illustrated or described herein. Furthermore, the terms "include" and "have" and any variations thereof are intended to cover non-exclusive inclusion, for example, processes, methods, systems, products, or devices that include a series of steps or units are not necessarily limited to those steps or units clearly listed, but may include other steps or units not expressly listed or inherent to these processes, methods, products, or devices. In addition, using "and/or" in the description and the claims indicate at least one of the connected objects, such as A and/or B and/or C, indicating seventh cases in which A exists alone, B exists along, C exists along, both A and B exist, both B and C exist, both A and C exist, and all o A, B and C exist. Similarly, use of "at least one of A and B" in this specification and in the claims should be understood as "a single A, a separate B, or both A and B".

Obviously, those skilled in the art may make various modifications and variations to the present disclosure without departing from the spirit and scope of the present disclosure. Thus, if these modifications and variations of the present disclosure fall within the scope of the claims and their equivalents, the present disclosure is also intended to encompass these modifications and variations.

What is claimed is:

1. A network analytics transfer method performed by a target network function entity, the method comprising:
receiving an analytics transfer request, wherein the analytics transfer request is configured to request to transfer first network analytics from a source network function entity to the target network function entity;
obtaining analytics aggregation information of the first network analytics according to the analytics transfer request, wherein the analytics aggregation information comprises aggregation indication information of one or more first network function sub-entities, and the one or more first network function sub-entities are configured to provide one or more first analytics results to the source network function entity;
performing network analytics aggregation according to the analytics aggregation information to obtain an aggregated analytics result of the first network analytics.

2. The method according to claim 1, wherein the aggregation indication information comprises one or more identifiers of the one or more first network function sub-entities or one or more addresses of the one or more first network function sub-entities.

3. The method according to claim 1, wherein the analytics aggregation information is included in an analytics context of the first network analytics.

4. The method according to claim 1, wherein obtaining the analytics aggregation information of the first network analytics according to the analytics transfer request comprises:
obtaining the analytics aggregation information from the source network function entity according to the analytics transfer request; or
obtaining the analytics aggregation information from a Data Repository Function (DRF) entity or a Data Collection Coordination Function (DCCF) entity according to the analytics transfer request.

5. The method according to claim 1, wherein performing the network analytics aggregation according to the analytics aggregation information to obtain the aggregated analytics result of the first network analytics comprises:
obtaining, according to the analytics aggregation information, one or more first analytics results provided by the one or more first network function sub-entities and related to the first network analytics;
performing an aggregation operation according to the one or more first analytics results to obtain the aggregated analytics result of the first network analytics.

6. The method according to claim 5, wherein before performing the aggregation operation according to the one or more first analytics results to obtain the aggregated analytics result of the first network analytics, the method further comprises: obtaining, according to the analytics aggregation information and/or local policy, a second analytics result provided by a second sub-network function entity and related to the first network analytics;
performing the aggregation operation according to the one or more first analytics results to obtain the aggregated analytics result comprises: aggregating the one or more first analytics results and the second analytics result to obtain the aggregated analytics result.

7. The method according to claim 5, wherein the aggregation indication information further comprises analytics aggregation description information of the one or more first network function sub-entities,
obtaining, according to the analytics aggregation information, one or more first analytics results provided by the one or more first network function sub-entities and related to the first network analytics comprises:
obtaining the one or more first analytics results provided by the one or more first network function sub-entities and related to the first network analytics, if the analytics aggregation description information of the one or more first network function sub-entities meets network analytics aggregation requirement of the target network function entity.

8. The method according to claim 5, wherein obtaining, according to the analytics aggregation information, the one or more first analytics results provided by the one or more first network function sub-entities and related to the first network analytics comprises:
sending, according to the analytics aggregation information, the analytics aggregation description information of the target network function entity to the one or more first network function sub-entities; and
obtaining the one or more first analytics results related to the first network analytics and provided by the one or more first network function sub-entities based on the analytics aggregation description information of the target network function entity.

9. A network analytics transfer method performed by a source network function entity, the method comprising:
sending an analytics transfer request to a target network function entity, wherein the analytics transfer request is configured to request to transfer first network analytics from the source network function entity to the target network function entity, so that the target network function entity obtains analytics aggregation information of the first network analytics according to the analytics transfer request, and performs network analytics aggregation according to the analytics aggregation information to obtain an aggregated analytics result of the first network analytics, wherein the analytics aggregation information comprises aggregation indication information of one or more first network function sub-entities, and the one or more first network function sub-entities are configured to provide one or more first analytics results to the source network function entity.

10. The method according to claim 9, wherein the analytics transfer request comprises the analytics aggregation information, or the analytics transfer request comprises a first identifier, so that the target network function entity requests the analytics aggregation information from a Data Repository Function (DRF) entity or a Data Collection Coordination Function (DCCF) entity according to the first identifier.

11. A target network function entity, comprising:
a memory, a transceiver, and a processor, wherein the memory is configured to store program instructions; the transceiver is configured to transmit and receive data under control of the processor, and the processor is configured to read the program instructions in the memory and execute following operations:
receiving an analytics transfer request through the transceiver, wherein the analytics transfer request is configured to request to transfer first network analytics from a source network function entity to the target network function entity;

obtaining analytics aggregation information of the first network analytics according to the analytics transfer request, wherein the analytics aggregation information comprises aggregation indication information of one or more first network function sub-entities, and the one or more first network function sub-entities are configured to provide one or more first analytics results to the source network function entity;

performing network analytics aggregation according to the analytics aggregation information to obtain an aggregated analytics result of the first network analytics.

12. The target network function entity according to claim 11, wherein the aggregation indication information comprises one or more identifiers of the one or more first network function sub-entities or one or more addresses of the one or more first network function sub-entities.

13. The target network function entity according to claim 11, wherein the analytics aggregation information is included in an analytics context of the first network analytics.

14. The target network function entity according to claim 11, wherein the processor is configured to read the program instructions in the memory and execute following operations:

obtaining the analytics aggregation information from the source network function entity according to the analytics transfer request; or obtaining the analytics aggregation information from a Data Repository Function (DRF) entity or a Data Collection Coordination Function (DCCF) entity according to the analytics transfer request.

15. The target network function entity according to claim 11, wherein the processor is configured to read the program instructions in the memory and perform following operations:

obtaining, according to the analytics aggregation information, one or more first analytics results provided by the one or more first network function sub-entities and related to the first network analytics;

performing an aggregation operation according to the one or more first analytics results to obtain the aggregated analytics result of the first network analytics.

16. The target network function entity according to claim 15, wherein the processor is configured to read program instructions in the memory and perform following operations:

obtaining, according to the analytics aggregation information and/or local policy, a second analytics result provided by a second sub-network function entity and related to the first network analytics;

aggregating the one or more first analytics results and the second analytics result to obtain the aggregated analytics result of the first network analytics.

17. The target network function entity according to claim 15, wherein the aggregation indication information further comprises analytics aggregation description information of the one or more first network function sub-entities, the processor is configured to read the program instructions in the memory and execute following operations:

obtaining, according to the analytics aggregation information, one or more first analytics results provided by the one or more first network function sub-entities and related to the first network analytics comprises:

obtaining the one or more first analytics results provided by the one or more first network function sub-entities and related to the first network analytics, if the analytics aggregation description information of the one or more first network function sub-entities meets network analytics aggregation requirement of the target network function entity.

18. The target network function entity according to claim 15, wherein the processor is configured to read program instructions in the memory and perform the following operations:

sending, according to the analytics aggregation information, the analytics aggregation description information of the target network function entity to the one or more first network function sub-entities; and obtaining the one or more first analytics results related to the first network analytics and provided by the one or more first network function sub-entities based on the analytics aggregation description information of the target network function entity.

19. A source network function entity, comprising:

a memory, a transceiver, and a processor, wherein the memory is configured to store a computer program; the transceiver is configured to transmit and receive data under control of the processor, and the processor is configured to read the computer program in the memory and perform steps of the method according to claim 9.

20. The source network function entity according to claim 19, wherein the analytics transfer request comprises the analytics aggregation information, or the analytics transfer request comprises a first identifier, so that the target network function entity requests the analytics aggregation information from a Data Repository Function (DRF) entity or a Data Collection Coordination Function (DCCF) entity according to the first identifier.

* * * * *